US011910757B2

(12) United States Patent
van Roje

(10) Patent No.: US 11,910,757 B2
(45) Date of Patent: Feb. 27, 2024

(54) KNOTTER HOOK FOR A TWINE KNOTTER OF A BALE PRESS

(71) Applicant: Maschinenfabrik Bernard Krone GmbH & Co. KG, Spelle (DE)

(72) Inventor: Lukas van Roje, Freren (DE)

(73) Assignee: Maschinenfabrik Bernard Krone GmbH & Co. KG, Spelle (DE)

( * ) Notice: Subject to any disclaimer, the term of this patent is extended or adjusted under 35 U.S.C. 154(b) by 330 days.

(21) Appl. No.: 17/392,293

(22) Filed: Aug. 3, 2021

(65) Prior Publication Data
US 2022/0030776 A1    Feb. 3, 2022

(30) Foreign Application Priority Data
Aug. 3, 2020   (DE) ............... 10 2020 120 447.7

(51) Int. Cl.
*A01F 15/14*    (2006.01)
*B65B 13/26*    (2006.01)

(52) U.S. Cl.
CPC ............ *A01F 15/145* (2013.01); *B65B 13/26* (2013.01)

(58) Field of Classification Search
CPC ...... A01F 15/145; A01F 15/14; A01F 15/141; A01F 15/146; A01F 15/148; B65B 13/26; B65B 13/24
See application file for complete search history.

(56) References Cited

U.S. PATENT DOCUMENTS

| | | | | |
|---|---|---|---|---|
| 1,529,914 A | * | 3/1925 | Rudolph | A01D 59/04 289/13 |
| 3,101,963 A | * | 8/1963 | Sullivan | B65B 13/26 289/9 |
| 3,254,911 A | * | 6/1966 | Crawford | A01D 59/04 100/22 |
| 3,301,583 A | | 1/1967 | Grichnik | |
| 3,468,575 A | * | 9/1969 | Grillot | A01D 59/04 289/11 |
| 4,055,328 A | * | 10/1977 | Simich | F16G 11/12 100/32 |

(Continued)

FOREIGN PATENT DOCUMENTS

| | | |
|---|---|---|
| CN | 103703941 | 4/2014 |
| CN | 209567136 | 11/2019 |

(Continued)

*Primary Examiner* — Ismael Izaguirre
(74) *Attorney, Agent, or Firm* — Gudrun E. Huckett

(57) ABSTRACT

A knotter hook for a twine knotter has a stationary clamping wing and a pivotable clamping wing, Stationary clamping wing and pivotable clamping wing have an extension component in a same spatial direction. The pivotable clamping wing has a projection projecting toward the stationary clamping wing. The pivotable clamping wing is pivotable reversibly from a closed state into an open state. A free end of the pivotable clamping wing in the open state is spaced apart farther from the stationary clamping wing than in the closed state. The pivotable clamping wing is laterally displaced relative to the stationary clamping wing at least in sections so that the pivotable clamping wing is arranged adjacent to the stationary clamping wing and below the pivotable clamping wing a free space is formed. The free space extends in the closed state opposite to the spatial direction beyond the projection.

23 Claims, 19 Drawing Sheets

(56) References Cited

U.S. PATENT DOCUMENTS 4,735,446 A * 4/1988 Homberg .............. A01F 15/145
                                                                     289/10
9,736,989 B2     8/2017 Verhaeghe et al.

FOREIGN PATENT DOCUMENTS

| DE | 919023 | 10/1954 |
|----|--------|---------|
| EP | 2 837 281 | 2/2015 |

* cited by examiner

KNOTTER HOOK FOR A TWINE KNOTTER OF A BALE PRESS

BACKGROUND OF THE INVENTION

The present invention concerns a knotter hook for a twine knotter for producing a loop knot, with at least one stationary clamping wing and a pivotably supported clamping wing that comprise an extension component in a same first spatial direction, wherein the pivotable clamping wing comprises a projection projecting in direction toward the stationary clamping wing and is pivotable reversibly from a closed into an open state so that a free end of the pivotable clamping wing in the open state is spaced apart farther from the stationary clamping wing than in the closed state. The present invention concerns moreover a knotter hook with two stationary clamping wings. The present invention concerns moreover a twine knotter with the knotter hook as well as a bale press with the twine knotter.

EP 2 837 281 A1 discloses a twine knotter for a bale press that is provided for knotting two tying agent strands that are used for tying a crop bale so that it does not fall apart. The knotter hook is provided for producing a knot in which the ends of the tying agent strands are pulled completely through a tying agent loop. It comprises a stationary knotter support that interacts with a pivotably supported knotter tongue in order to secure the free ends of the tying agent strands during knotting of the tying agent strands in a gap between the knotter support and the knotter tongue. At the free end of the pivotable knotter tongue, a barbed hook is arranged that engages a cutout of the knotter support.

For knotting the tying agent strands, they are first wound upon rotation of the knotter hook about the knotter support so that a tying agent loop is formed about the knotter support. The end of the tying agent strands is then inserted between the knotter support and the knotter tongue and clamped thereat. When subsequently the loop is stripped off, the barbed hook secures the tying agent strands so that they are pulled through the tying agent loop. After the tying agent loop has slipped off the knotter support, the knotter tongue is free so that, upon pull action on the knot, it can pivot upwardly and releases the tying agent strands. In doing so, the tying agent strands detach and the thus finished knot is pulled at the end from the knotter hook approximately in an extension direction of the knotter support and of the knotter tongue.

In a loop knot in which the ends of the tying agent strands are not completely pulled through the tying agent loop, the knotter tongue must be pivoted very far upwardly so that, despite the barbed hook at the knotter tongue, it is ensured that the loop knot is safely stripped off the knotter hook.

Object of the invention is to provide a knotter hook for a twine knotter that reliably ensures stripping off a knot, in particular a loop knot, from the knotter hook as well as a twine knotter with such a knotter hook and a bale press with such a twine knotter.

SUMMARY OF THE INVENTION

The object is solved with a knotter hook for a twine knotter for producing a loop knot, with at least one stationary clamping wing and a pivotably supported clamping wing that comprise an extension component in a same first spatial direction, wherein the pivotable clamping wing comprises a projection projecting in the direction toward the stationary clamping wing, wherein the pivotable clamping wing is pivotable reversibly from a closed into a open state so that a free end of the pivotable clamping wing in the open state is spaced apart farther from the stationary clamping wing than in the closed state, characterized in that the pivotable clamping wing is laterally displaced relative to the stationary clamping wing at least in sections so that it is arranged adjacent to the stationary clamping wing and so that below the pivotable clamping wing a free space is formed which, in the closed state, extends opposite to the first spatial direction beyond the projection.

The object is solved with a knotter hook for a twine knotter for producing a loop knot, with at least one stationary clamping wing and a pivotably supported clamping wing that comprise an extension component in a same first direction, wherein the pivotable clamping wing comprises a projection projecting in the direction toward the stationary clamping wing, wherein the pivotable clamping wing is pivotable reversibly from a closed into an open state so that a free end of the pivotable clamping wing in the open state is spaced apart farther from the stationary clamping wing than in the closed state, characterized in that it comprises a further stationary clamping wing, wherein between the stationary clamping wings a gap is formed and the pivotable clamping wing extends in and/or above the gap between the stationary clamping wings, and wherein the gap in the closed state extends opposite to the first spatial direction beyond the projection.

The object is solved with a twine knotter with a knotter hook according to the present invention.

The object is solved with a bale press with a twine knotter with a knotter hook according to the present invention.

Advantageous embodiments can be taken from the dependent claims.

For this purpose, a knotter hook for a twine knotter is created. The knotter hook is provided for producing a loop knot. It comprises at least one stationary clamping wing.

In addition, at the knotter hook a further clamping wing is pivotably supported. The clamping wings comprise an extension component in a same first direction. In this context, the pivotable clamping wing can be arranged height-displaced, at least in sections and at least minimally, relative to the stationary clamping wing in a second spatial direction that extends transversely to the first spatial direction.

At the pivotable clamping wing, a projection is moreover provided. The projection projects in the direction toward the stationary clamping wing. It extends therefore opposite to the second spatial direction. Furthermore, it comprises preferably an approximately hook-shaped contour.

The pivotable clamping wing is reversibly pivotable from a closed state into an open state, in particular about a pivot wing bearing in a wing pivot direction, so that a free end of the pivotable clamping wing in the open state is spaced apart farther from the stationary clamping wing than in the closed state. In the open state, tying agent strands are insertable between the pivotable clamping wing and the stationary clamping wings. In the closed state, tying agent strands to be knotted together are safely clamped between the at least one stationary and the pivotable clamping wing.

The knotter hook is characterized in that the pivotable clamping wing is laterally displaced relative to the stationary clamping wing at least in sections, in particular at the end, and further in particular in a third spatial direction that extends transversely to the first and the second spatial direction. In this way, the pivotable clamping wing, at least in sections, is arranged adjacent to the stationary clamping wing. Moreover, a free space is formed in this way below the pivotable clamping wing. In the closed state, the free space extends still beyond the projection opposite to the first spatial direction.

Even though the tying agent strands when stripped off the knotter hook are placed about the in particular the hook-shaped projection, the gap and the free space extending beyond the projection below the pivotable clamping wing enable pulling off the knot in downward direction so that the knot can be reliably released from the knotter hook. A downward pull at the knot which is required for this is caused by the crop bale about which the tying agent strand serving as a lower thread is wound. Since the knot is sliding downwardly, it is in this context not required that the pivotable clamping wing must be released beforehand in order to pivot in upward direction into the open state.

In a preferred embodiment, the knotter hook comprises a further stationary clamping wing. The further stationary clamping wing, in particular in the third spatial direction, is spaced apart from the at least one stationary clamping wing. In this way, the free space forms a gap between the stationary clamping wings. The configuration of the knotter hook with two stationary clamping wings enables a simplified manipulation of the tying agent loop that is wound about the knotter hook upon formation of the knot, in particular during stripping off at the end of the knot forming process.

The object is also solved by a knotter hook that, aside from the at least one stationary clamping wing, has a further stationary clamping wing, wherein a gap is formed between the stationary clamping wings. In the closed state, the pivotable clamping wing extends, in particular in the second spatial direction, in and/or above the gap between the stationary clamping wings. In this context, the gap extends in the closed state opposite to the first spatial direction beyond the projection.

In this configuration, there is also provided an embodiment of the knotter hook with which a simple stripping off of the finished knot is possible through the gap in downward direction.

In this context, it is preferred that the gap extends at least along approximately a fourth of a length of the at least one stationary clamping wing or more, particular preferred approximately along a third of the length of the at least one stationary clamping wing or more, opposite to the first spatial direction beyond the projection. In this way, the part of the gap that is extending, viewed opposite to the first spatial direction, behind the projection is sufficiently large in order to reliably ensure stripping off of the loop of the knot in downward direction for the usually employed tying material thicknesses.

In a preferred embodiment, the pivotable clamping wing, in a viewing direction opposite to the second spatial direction, i.e., in a plan view, is arranged at least at its end in particular centrally between the two stationary clamping wings, or the stationary clamping wings are mirror-symmetrical relative to a fictitious line which is extending centrally through the pivotable clamping wing. In this way, uniform clamping forces result when the movable clamping wing interacts with the stationary clamping wings of the knotter hook. On the one hand, this increases the process reliability. On the other hand, this arrangement is advantageous when pulling through the tying agent strands through the tying agent loop.

In order to simplify pulling through the tying agent strands even more, it is moreover preferred that the stationary clamping wings are of the same length. Also, it is advantageous for this when the pivotable clamping wing is shorter than the at least one or the stationary clamping wings. In this way, the tying agent strands, when pulling off the tying agent loop from the knotter hook, can be pulled far enough through the tying agent loop in order to form a loop knot that reliably holds without the ends of the tying agent strands having to be pulled completely through the tying agent loop.

However, an embodiment is also preferred in which either a stationary clamping wing is embodied somewhat shorter than the other clamping wings, or at least one of the two clamping wings is rounded or formed with a slant at the end. In this way, the loop knot can tighten at least slightly toward the end of the knot forming process.

For this purpose, the projection is moreover preferably arranged at the free end of the pivotable wing. The hook-shaped configuration, in particular a triangular configuration, enables in this context a reliable pulling at the ends of the tying agent strands. For this purpose, the projection extends moreover preferably at a substantially right angle in relation to a pivot wing of the pivotable wing at which it is arranged. In this way, the tying agent strands can slide easily off the projection. In principle, a knotter hook is also preferred in which the projection extends at an acute angle in relation to the pivot wing so that it is slanted toward a shaft-side end of the pivot wing.

In this context, it is furthermore preferred that the pivotable clamping wing at least in sections is narrower than the gap. In this way, a free space is formed laterally of the pivotable clamping wing between it and one of the stationary clamping wings, respectively. Thus, release of the knot from the knotter hook is further facilitated.

It is moreover preferred that the knotter hook comprises a shaft for a support action in the twine knotter. For forming a tying agent loop, the knotter hook must carry out a rotational movement about its own axis. Such a rotational movement can be started, for example, by at least one tooth segment which is arranged on a rotatingly driven knotter disk. The support action of the knotter hook by means of an elongate shaft provides in this context an effective solution for controlling the tensioning forces which in current times are demanded to be higher and higher. In this context, the shaft and the stationary clamping wings are preferably arranged at an angle relative to each other. Preferably, they are arranged approximately in an L-shape relative to each other. For this purpose, the base of the knotter hook has a bend that is embodied rounded so that the base at the bend has no edges at which the tying agent strands may chafe. Due to this configuration, the installation space required for rotation of the knotter hook is minimal.

Preferred is furthermore a configuration of the gap between the two stationary clamping wings in which the gap is embodied substantially U-shaped or V-shaped. In case of a U-shaped configuration, the gap along its length is substantially of the same width. In contrast thereto, it tapers toward the shaft-side end in case of a V-shaped configuration. Since the gap extends opposite to the first spatial direction to the shaft-side end beyond the projection, such a gap enables stripping off the finished knot.

In a particularly preferred embodiment, the gap comprises however additionally an expansion at the shaft side. Thereby, it is of a keyhole shape, for example. In this context, it is enlarged at least in the region of its shaft-side end. In this context, it is preferred that the projection in the closed state dips into the expansion so that there is sufficient space remaining about the projection for the tying agent strands. A finished knot can therefore more easily fall through the gap after being stripped off from the knotter hook. In this context, it should be noted that, when stripping off the finished knot, a movement of the knot in a direction opposite to the second spatial direction is required, namely in the direction that leads to the finished crop bale.

A length of the gap or a length of the at least one stationary clamping wing relates to a length of the base in a holding region of the knotter hook, which is provided for clamping tying agent strands between the at least one stationary clamping wing and the pivotable clamping wing, preferably at least in a ratio of 1:1 or larger, particularly preferred 2:1 or even larger. The base extending below the pivotable clamping wing is therefore embodied rather short in comparison to the gap or to the at least one stationary clamping wing. It is provided substantially for stabilization of the knotter hook. The gap that is larger all the more facilitates the falling action of the knot at the end of the knot forming process. For this purpose, it is furthermore preferred that an end face of the gap extends substantially in the second spatial direction so that a finished knot does not get caught at the end face or an edge of the end face, or get chafed.

The object is furthermore solved by a twine knotter with such a knotter hook. In a particularly advantageous manner, by providing a gap between the two stationary clamping wings which extends at the shaft side beyond the projection, it is provided that for the finished knot, when stripped off the knotter hook, a sufficient amount of free space below the pivotable clamping wing is made available in order to detach and move away from the knotter hook in the direction toward the crop bale. On the other hand, the two stationary clamping wings provide for a sufficient guiding action so that in a reliable manner the loop formation with the subsequent pulling in off the free ends of the tying agent strands the completion of the knot can be performed. In the embodiment in which only one stationary clamping wing is employed, the expenditure has been further minimized.

The object is furthermore solved with a bale press with such a twine knotter. The bale press enables in this context by use of the functional component groups that are known from the prior art, such as a pick-up device for picking up the crop to be pressed, a conveying and cutting device for conveying the crop into a preferably cuboid-shaped press channel, in which a reciprocatingly driven press piston provides for compression of the crop, a process-reliable manufacture of crop bales that are surrounded by tying agent strands. In an advantageous manner, in this bale forming process no twine rests are produced anymore which lead to a contamination of the feed or a negative effect on the environment. The bale press is provided with a plurality of twine knotters for this purpose.

In the following, the invention will be explained with the aid of Figures. The Figures are to be understood only as examples and do not limit the general concept of the invention.

BRIEF DESCRIPTION OF THE DRAWINGS

FIG. 3b shows a twine holding disk for the twine knotter of FIG. 3a.

DESCRIPTION OF PREFERRED EMBODIMENTS

Figure 1A:
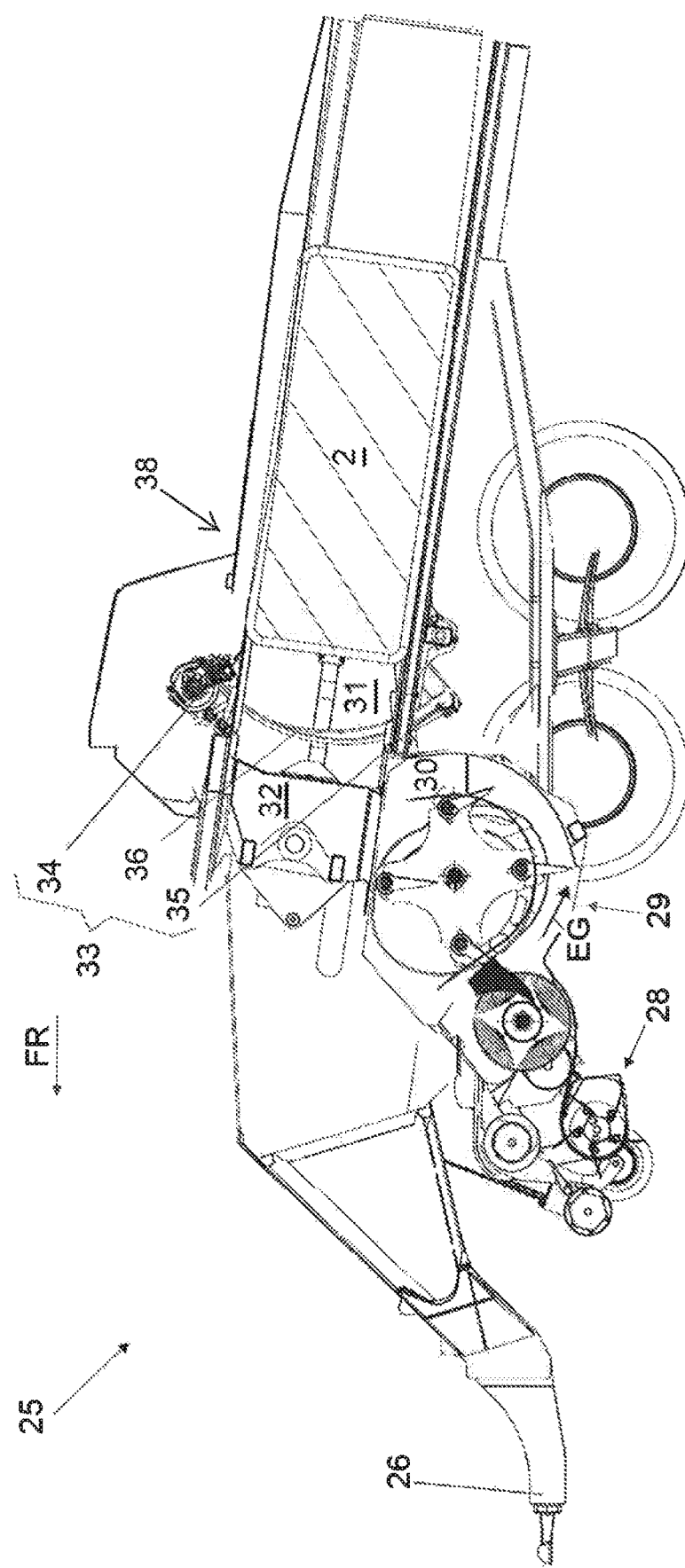
FIG. 1a shows schematically a bale press and FIG. 1b a knotter arrangement for the bale press of FIG. 1a with a plurality of twine knotters.

FIG. 1a shows schematically a bale press 25, here a square bale press. In the following, the terms bale press 25 and square bale press are used synonymously.

The bale press 25 is configured to be pulled behind a tractor (not illustrated). It comprises for this purpose a trailer coupling 26 at the front in travel direction FR. The invention is however also usable in self-propelled bale presses.

The bale press 25 comprises as a receiving device 28a pick-up for picking up crop from the ground 27. The crop is supplied to a cutting device (not identified) that is arranged downstream of the pick-up device 28 in a crop flow direction EG. After cutting, it is supplied to a conveying and collecting device 29 which is provided for collecting and pre-compressing the crop. The conveying and collecting device 29 comprises for this purpose a collecting chamber 30. In crop flow direction EG downstream thereof, a press channel 31 is provided. With sufficient pre-compression of the crop, it is conveyed by means of a rake that is configured as a feed rake (not identified) of the conveying and collecting device 29 into the press channel 31. Here, it is pressed to a square bale 2 by means of a pressing piston 32 which is cyclically reciprocated in the press channel 31.

The square bale press 25 comprises a tying device 33 which is provided for tying the square bale 2 so that it does not fall apart anymore. For this purpose, the tying device 33 comprises a knotter arrangement 34 with a plurality of twine knotters 1 (see FIG. 1b). The twine knotters 1 are each provided for knotting tying agent strands 4.1, 4.2 of a thread-shaped tying agent, i.e., an upper thread 4.1 and a lower thread 4.2, to each other to form a knot 3 (see FIG. 2k). The twine knotters 1 are arranged at a top side 38 of the bale press 25 above the press channel 31.

The term tying agent strand is used in the context of this invention synonymously for the upper thread 4.1 and the lower thread 4.2.

For supply of the upper threads 4.1, the tying device 22 comprises for each one of the twine knotters 1 an upper twine needle 47 (see FIGS. 2a to 2k). Moreover, the tying device 33 comprises a bottom twine guide 35 that is provided for guiding the lower threads 4.2. The bottom twine guide 35 is arranged below the press channel 31. It comprises for each one of the twine knotters 1 a respective bottom twine needle 36. Upon driving the bottom twine guide 35, the bottom twine needles 35 and therewith the lower threads 4.2 are guided respectively to the twine knotter 1 correlated with them.

A crop bale 2 is tied when a nominal value for a bale length has been reached or surpassed.

Figure 1B:
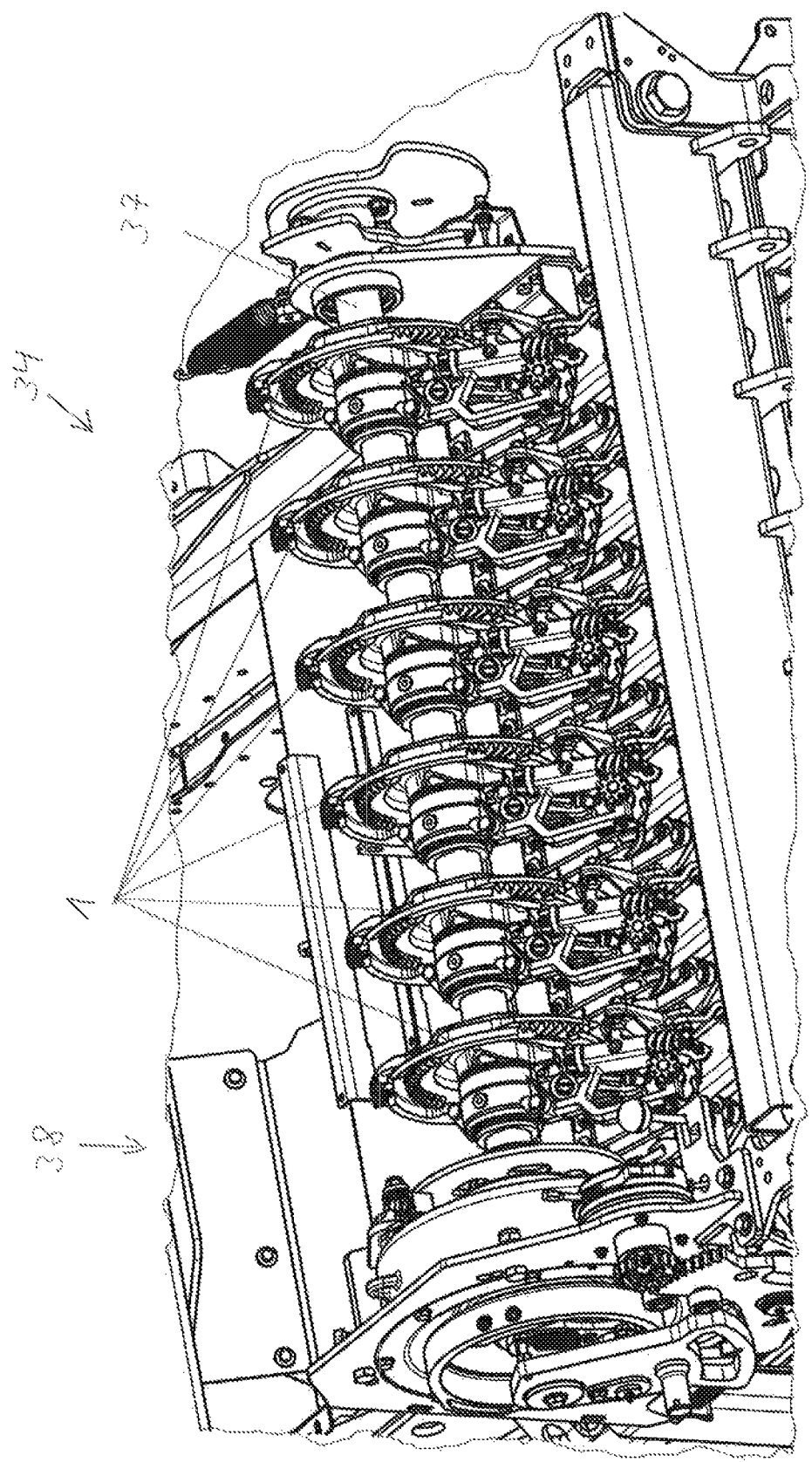

FIG. 1b shows the knotter arrangement 34 for the bale press 25 of FIG. 1a. The knotter arrangement 34 is arranged at the top side 38 of the bale press 25 and comprises the plurality of twine knotters 1. The twine knotters 1 are arranged spaced apart from each other along a knotter shaft 37.

Figure 2A:
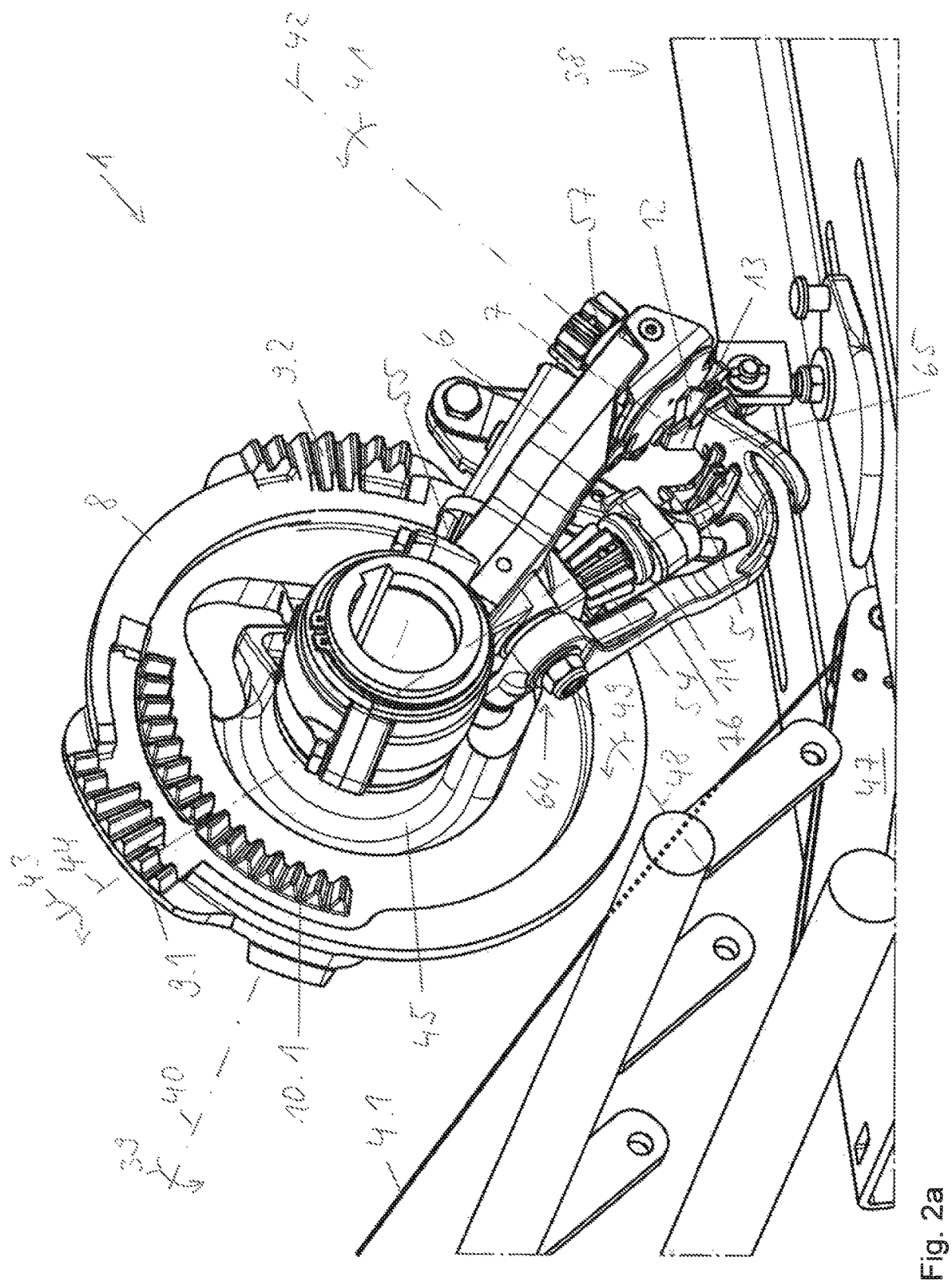
FIGS. 2a, 2b, 2c, 2d, 2e, 2f, 2g, 2h, 2i, 2j, 2k show respectively one of the twine knotters or an enlarged detail of the twine knotter of the knotter arrangement of FIG. 1b in a perspective view.
Figure 2B:
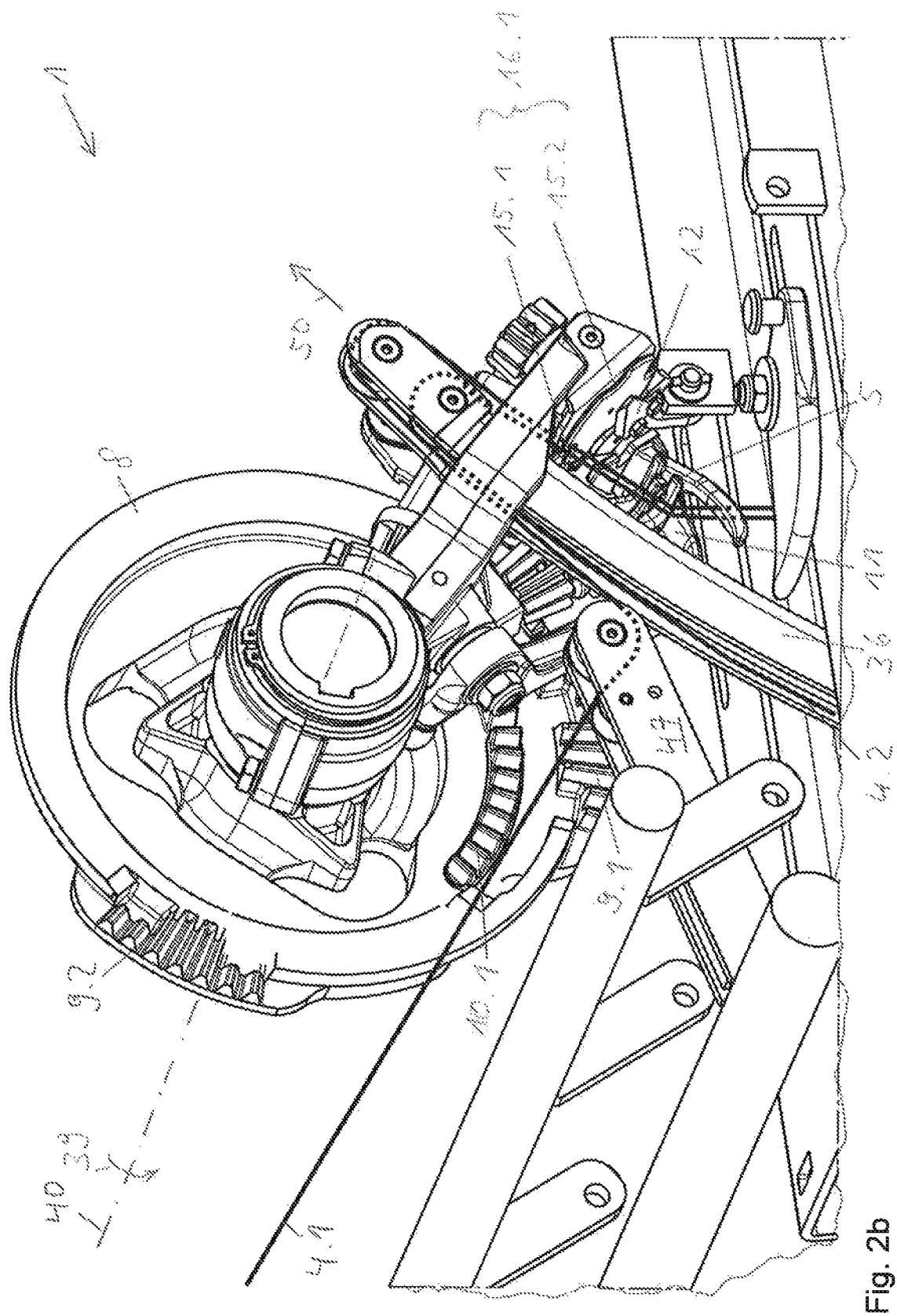
Figure 2C:
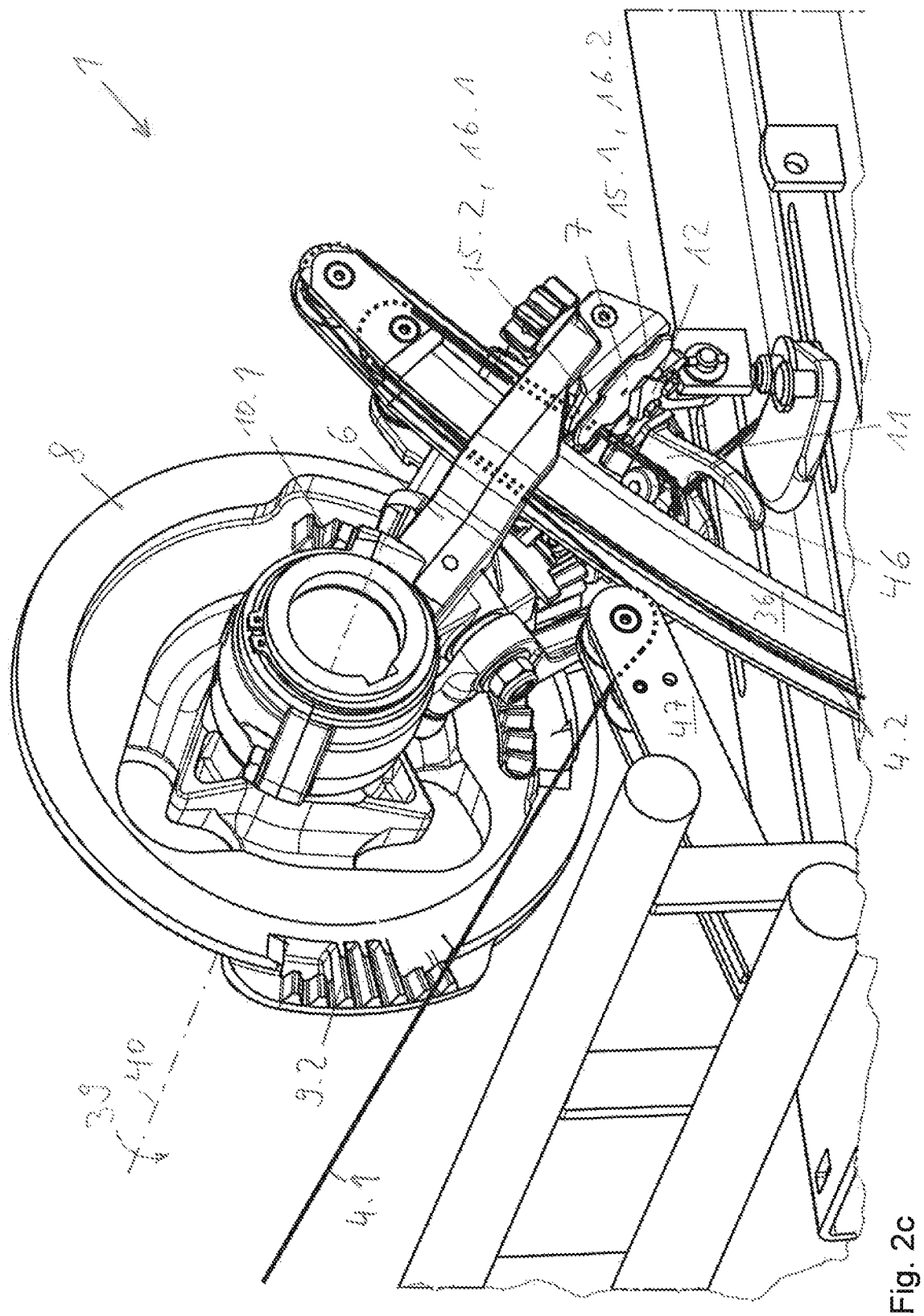
Figure 2D:
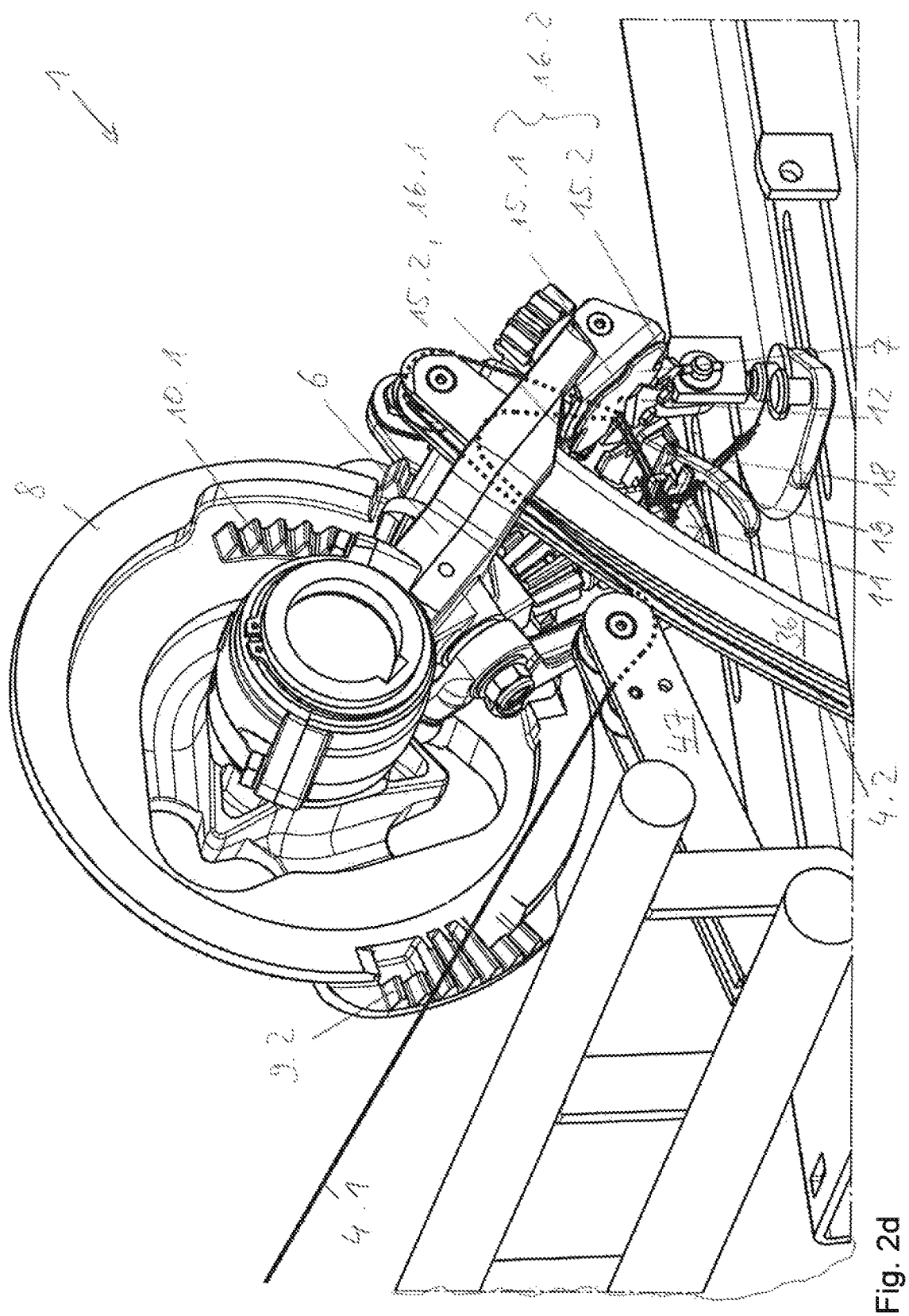
Figure 2E:
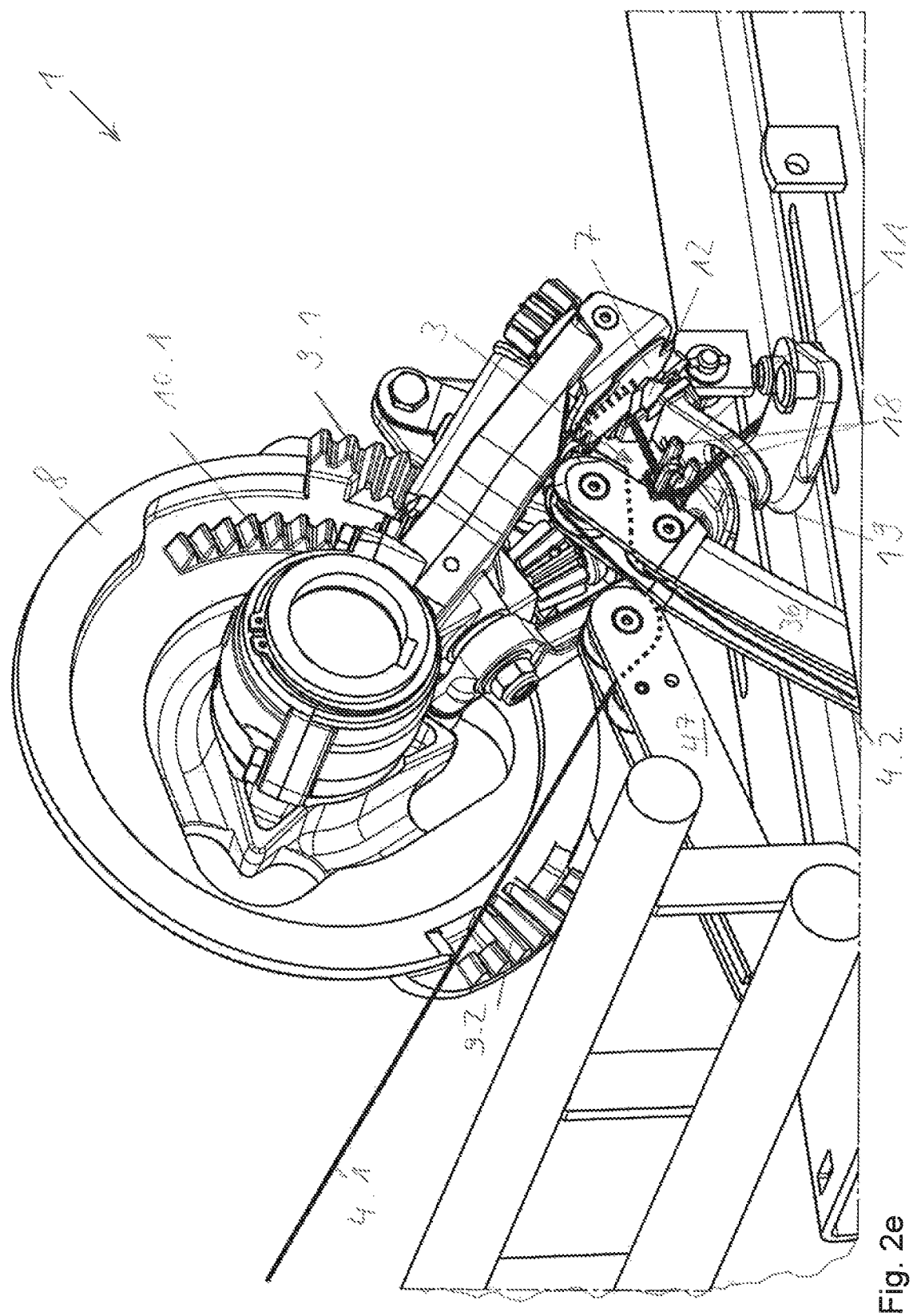
Figure 2F:
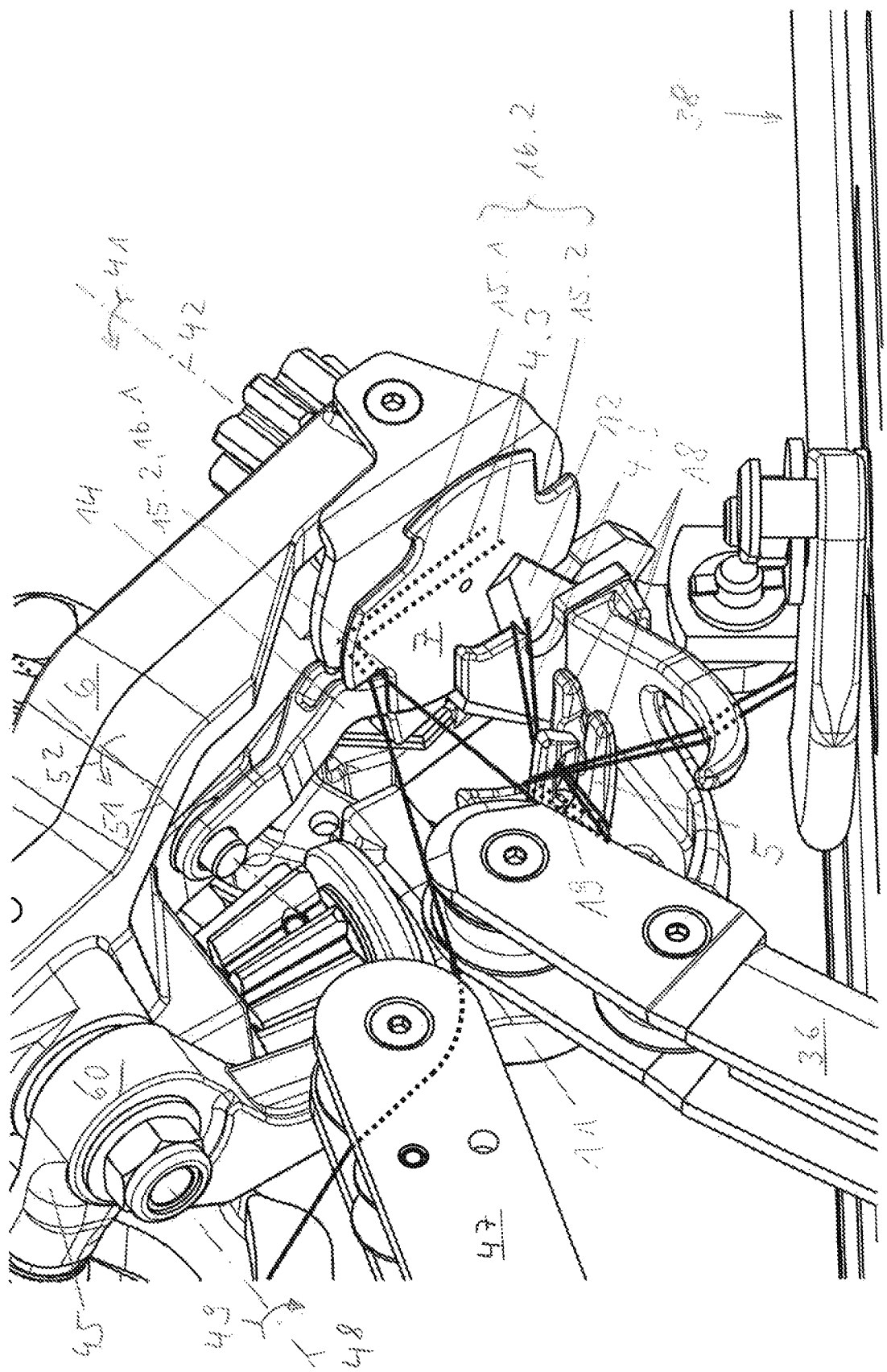
Figure 2G:
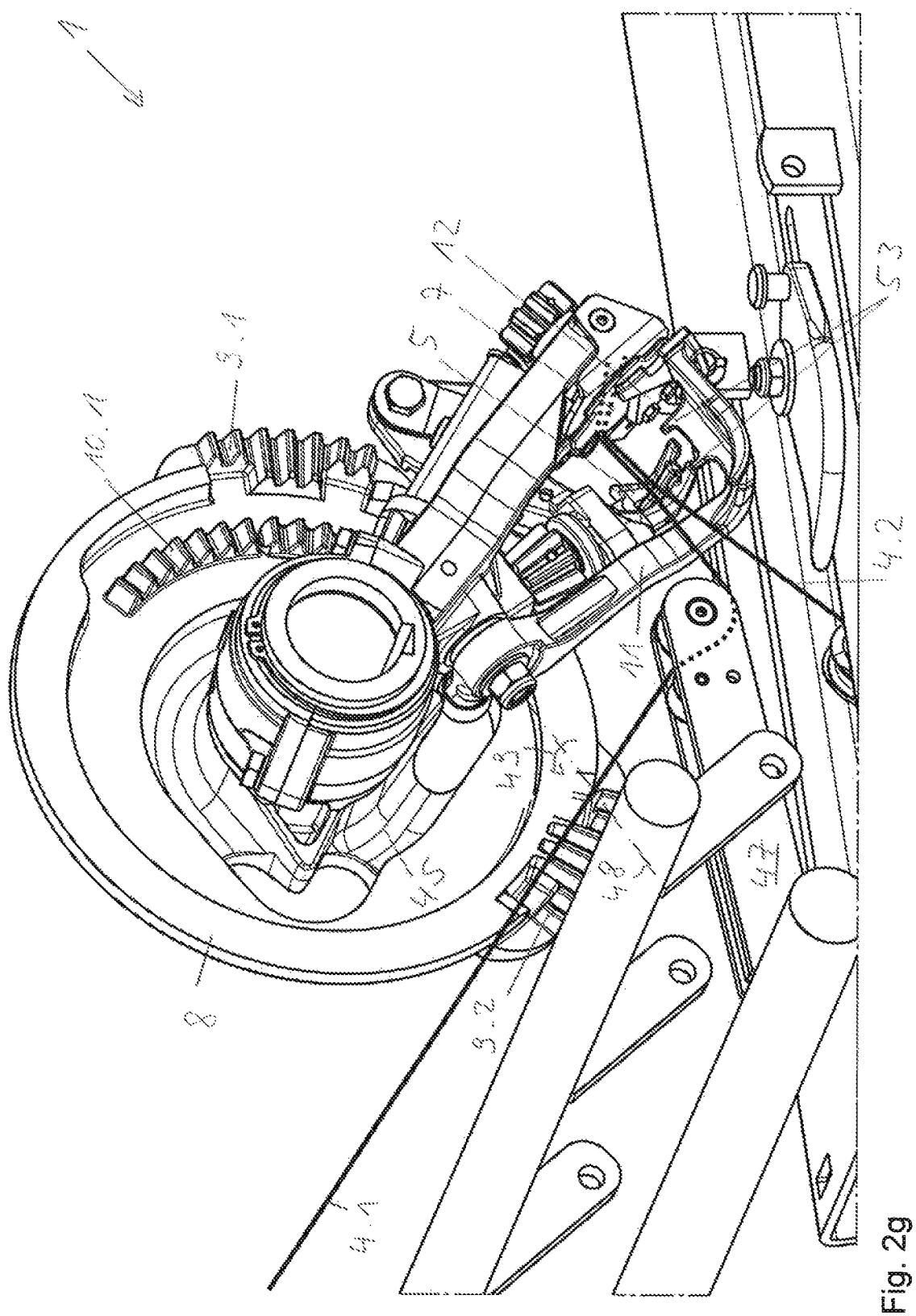
Figure 2H:
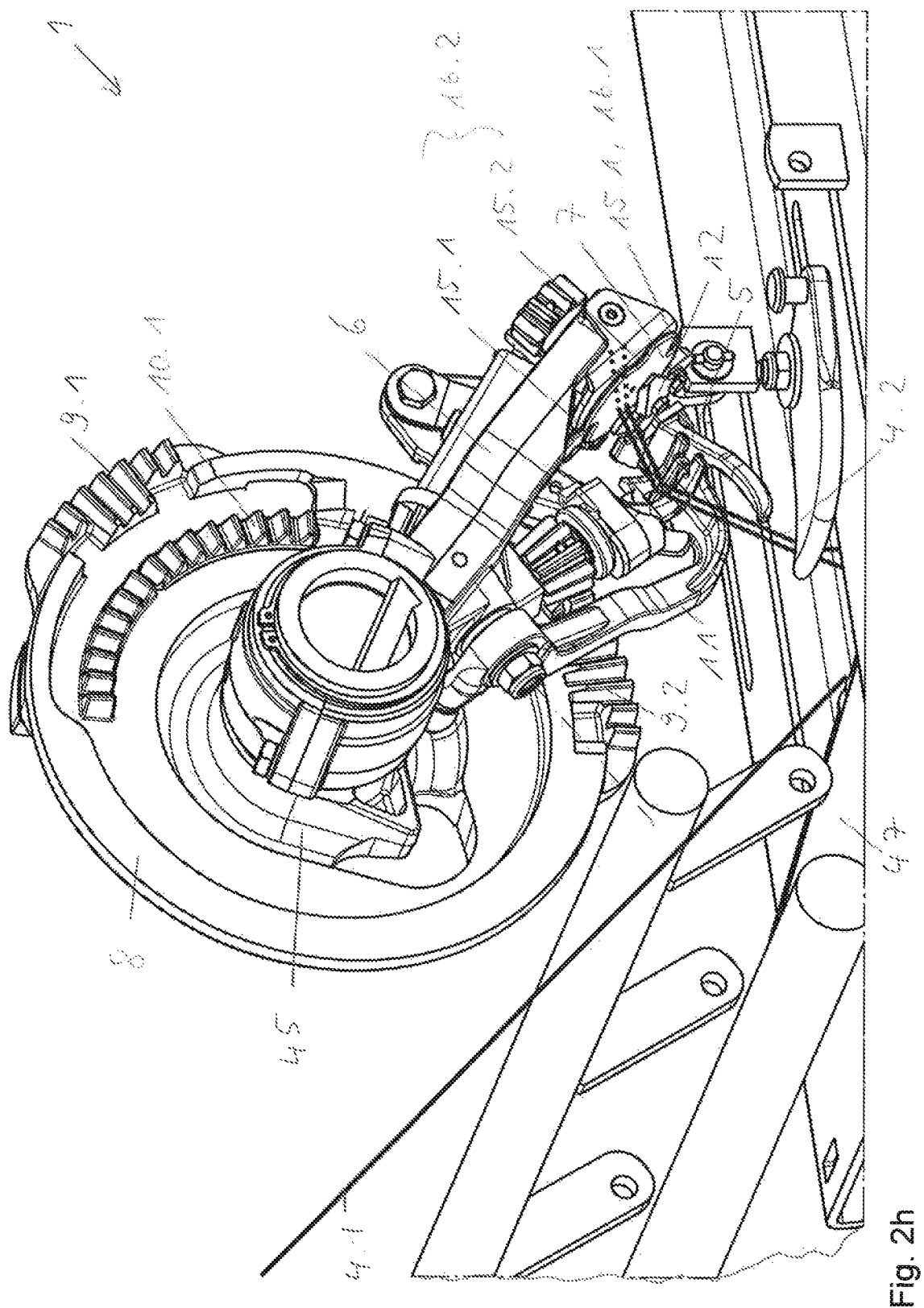
Figure 2I:
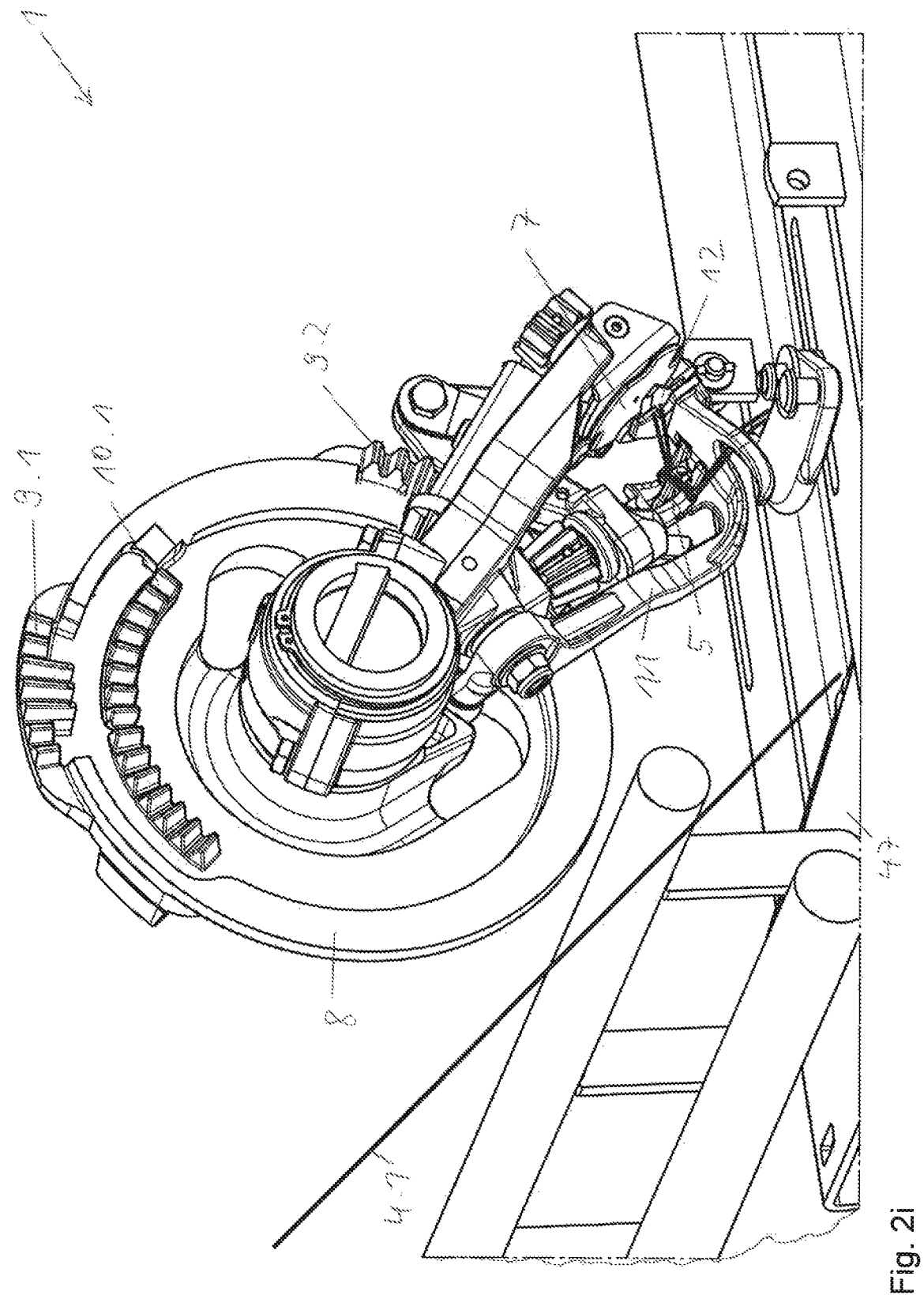
Figure 2J:
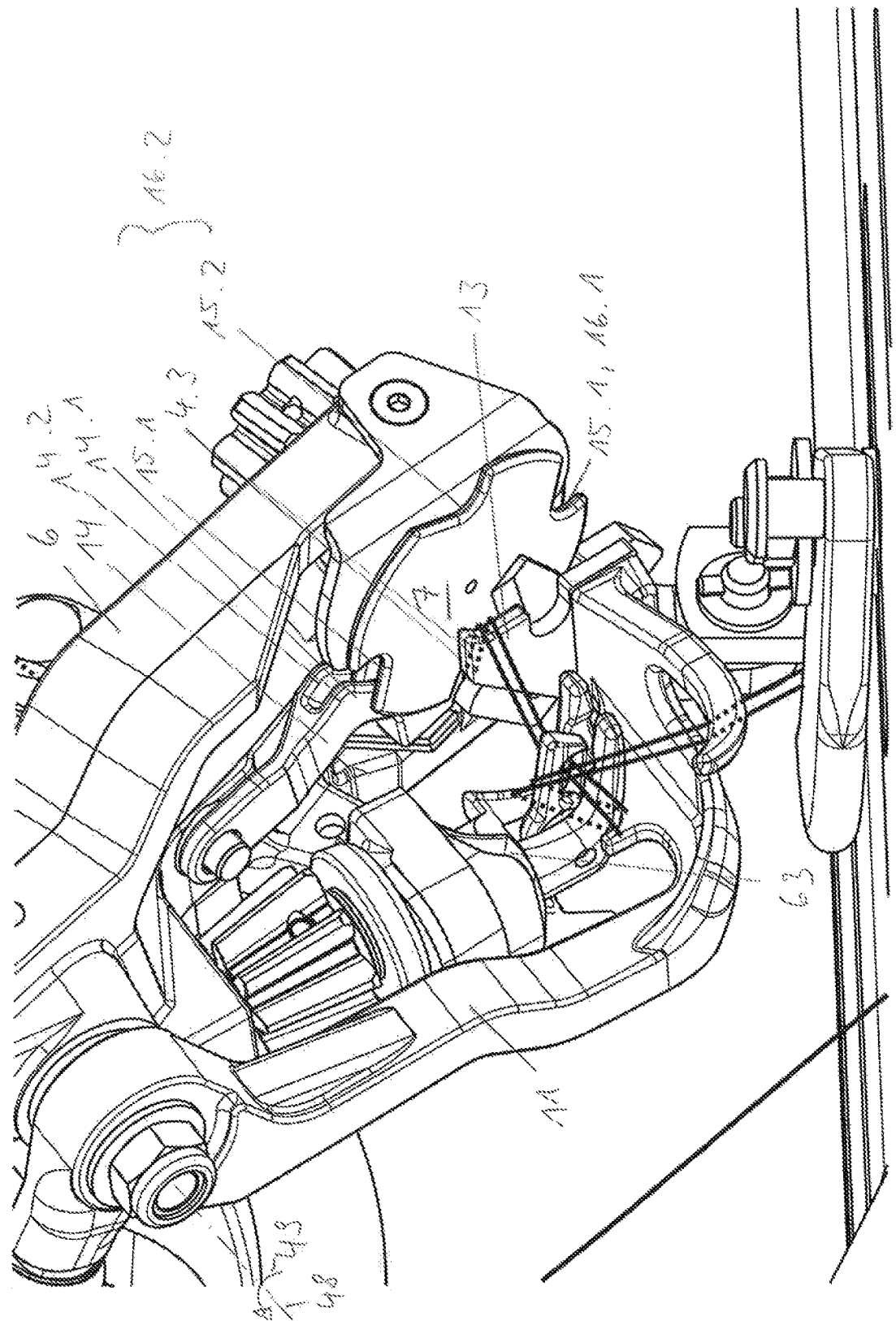

FIGS. 2a-2k show respectively one of the twine knotters 1 or a partial enlarged view of the twine knotter 1 of the knotter arrangement 34 of FIG. 1b. FIGS. 2f and 2j show the enlarged views.

The twine knotter 1 comprises a knotter disk 8 which is held fixedly on the knotter shaft 37. The knotter disk 8 rotates therefore upon driving the knotter shaft 37 together with latter. In addition, the twine knotter 1 comprises a knotter frame 6 which is arranged so as to rotate in relation to the knotter shaft 37 at the latter so that upon driving of the knotter shaft 37 it does not rotate therewith and is arranged stationarily in the bale press 25.

FIGS. 2a-2e, 2g-2i, and 2k show the twine knotter 1 in the same perspective view, respectively, in different drive states that it is subjected to upon driving of the knotter shaft 37, wherein the drive states differ by a rotational angle (not identified) from each other about which the knotter disk 8 has been rotated together with it relative to a zero position. FIG. 2f shows an enlarged detail of FIG. 2e and FIG. 2j shows an enlarged detail of FIG. 2i, wherein FIG. 2f and FIG. 2j each show a further perspective view. FIG. 3a shows an enlarged detail of the twine knotter 1 of FIGS. 2a-2k without the tying agent strands 4.1, 4.2 at a rotational angle of approximately 320°.

The twine knotter 1 is configured to form two sequential knots 3 that are provided for connecting the upper thread 4.1 and lower thread 4.2 of the tying agent surrounding the crop bale 2. It is thus a double knotter. The terms twine knotter 1 and double knotter are therefore used synonymously in the context of this invention.

The twine knotter 1 comprises for this purpose a knotter hook 54 for knotting the ends 4.3 of the tying agent 4.1, 4.2, which is supported in the knotter frame 6 so as to be rotatable about a knotter hook axis 44 in a knotter hook rotational direction 43.

Figure 3A:
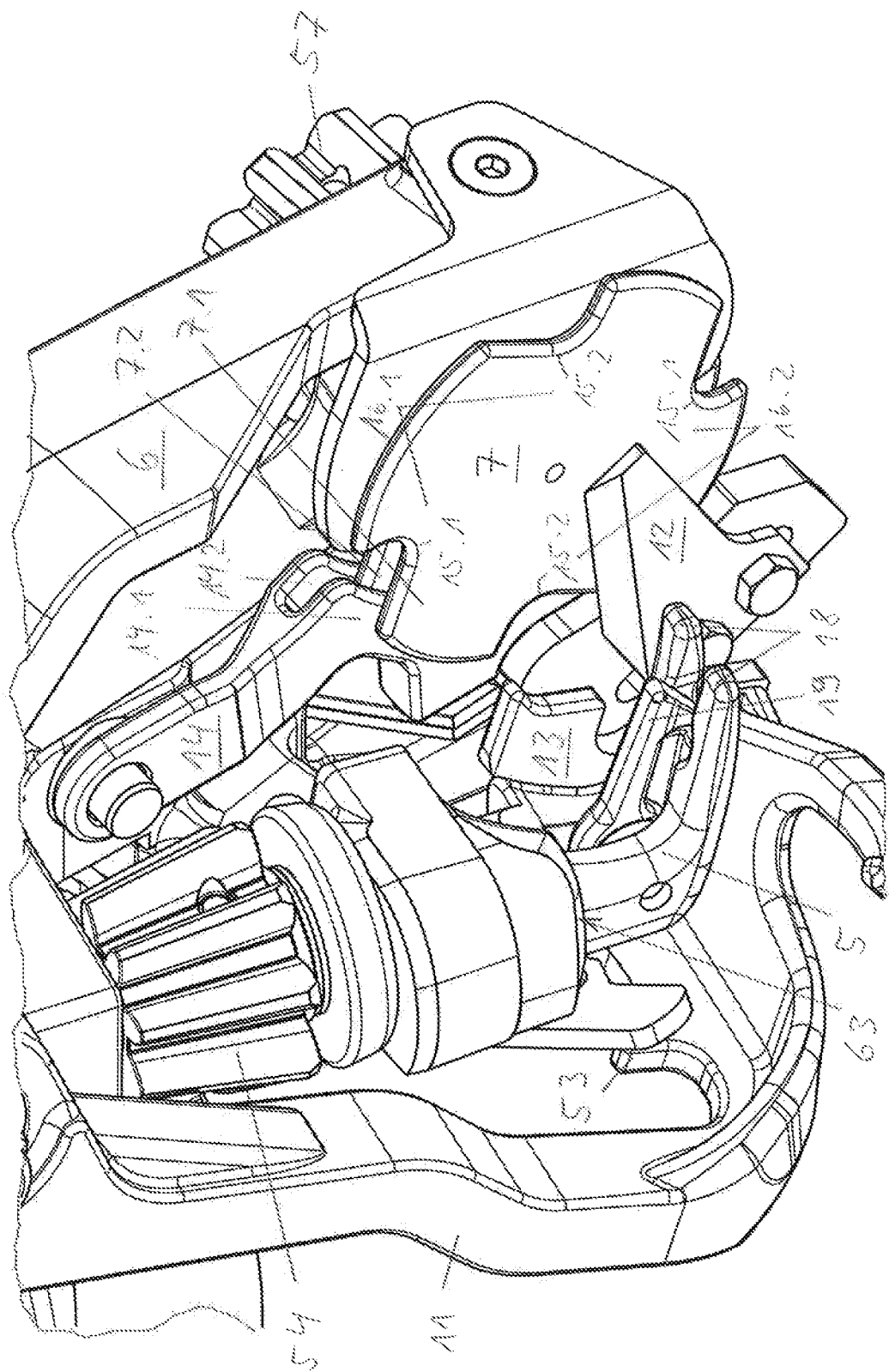
FIG. 3a shows an enlarged detail view of the twine knotter of FIG. 2a to FIG. 2k.
Figure 3B:
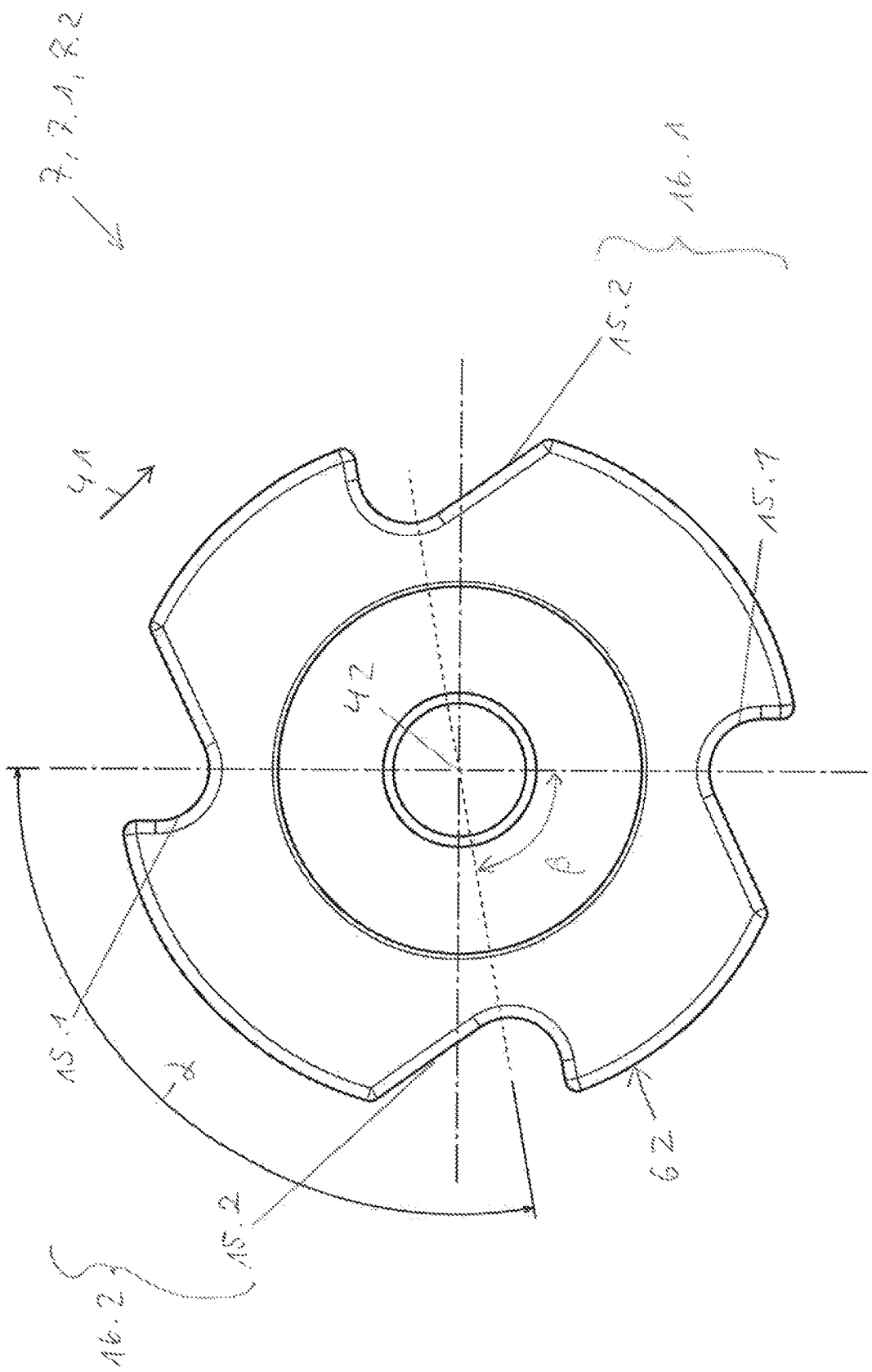
Figure 3C:
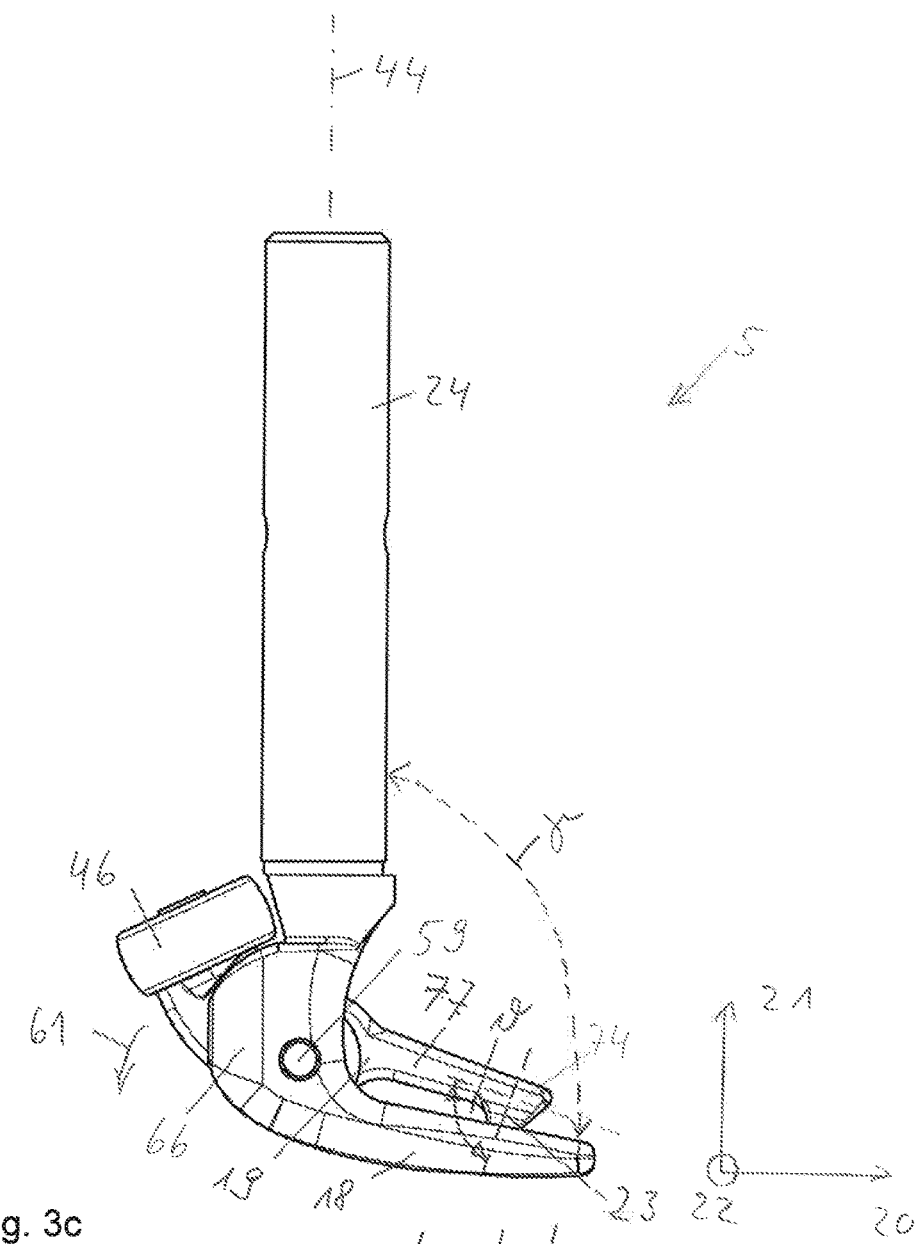
FIG. 3c shows a knotter hook for the twine knotter of FIG. 3a in a side view.
Figure 3D:
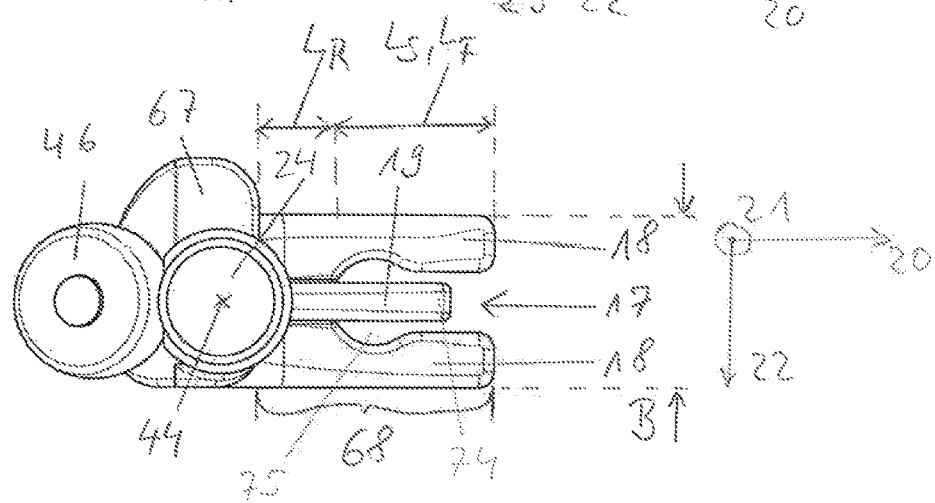
FIG. 3d shows a plan view of the knotter hook of FIG. 3c.

The knotter hook 5 is separately illustrated in FIGS. 3c and 3d. It comprises two stationary clamping wings 18 that are spaced apart from each other in a third spatial direction 22 and comprise a length extension component (not illustrated) in a first spatial direction 20. In this context, the third spatial direction 22 is arranged transversely to the first spatial direction 20. Between the stationary clamping wings 18, an approximately keyhole-shaped gap 17 is provided. In a second spatial direction 21, a pivotable clamping wing 19 is additionally arranged which is displaced in height direction relative to the stationary clamping wings 18. The second spatial direction 21 extends transversely to the first spatial direction 20 as well as transversely to the third spatial direction 22. The pivotable clamping wing 19 comprises a hook-shaped projection 20 that extends opposite to the second spatial direction 21 so that it is pointing in the direction toward the gap 17. In a closed state (not identified) shown in FIG. 3c, the projection 20 at least minimally projects into the gap 17. The pivotable clamping wing 19 is pivotably supported in a pivot wing bearing 59 that is arranged in the third spatial direction 22 above the stationary clamping wings 18.

For pivoting the pivotable clamping wing 19 from the closed state into an open state (not illustrated), the knotter hook 5 comprises a control roller 46 that upon rotation of the knotter hook 5 about the knotter hook axis 44 rolls along a control guide 63 (see FIG. 3a). The control roller 46 is arranged at side (not identified) of the knotter hook 5 that is facing away from the stationary clamping wings 18. It is fastened at the pivotable clamping wing 19 and is shaped such that the latter, in accordance with the contour of the control guide, is pivoted in and opposite to a wing pivot direction 61 when the control roller 46 rolls along the control guide. Upon pivoting of the pivotable clamping wing 19 in the wing pivot direction 61, it opens in relation to the stationary clamping wings 18. In this open state, the tying agent strands 4.1, 4.2 can be placed into the intermediate space (not identified) between the stationary clamping wings 18 and the pivotable clamping wing 19. Upon pivoting back from the open state into the closed state, the tying agent strands 4.1, 4.2 are clamped between the stationary clamping wings 18 and the pivotable clamping wing 19.

The twine knotter 1 comprises in addition a holding arrangement (not identified) which is provided for holding the tying agent strands 4.1, 4.2. The holding arrangement comprises a twine holding disk 7 which is supported at the knotter frame 6 so as to be rotatable about a twine holding disk axis 42 in a twine holding disk rotational direction 41. The twine holding disk 7 is provided for temporary conveyance of the two tying agent strands 4.1, 4.2 of the tying agent.

At its outer contour 62 (see FIG. 3c), it comprises at least a first pair 16.1 of two recesses 15.1, 15.2. In this context, each one of the two recesses 15.1, 15.2 is provided for receiving the tying agent strands 4.1, 4.2, respectively, when producing one of the two knots 3. In relation to a rotational movement of the twine holding disk 7 in twine holding disk rotational direction 41 about the twine holding disk axis 42, the recesses 15.1, 15.2 are arranged rotated relative to each other opposite to the clockwise direction by a displacement angle α that is greater than 90°. The earlier recess 15.1 in relation to the rotational movement in the twine holding disk rotational direction 41 is provided for receiving the tying agent strands 4.1, 4.2 for the first one of the two knots 3 and the later recess 15.2, in relation to the rotational movement in the twine holding disk rotational direction 41, is provided for receiving the tying agent strands 4.1, 4.2 for the second one of the two knots 3. The displacement angle α which exceeds 90° enables a reliable renewed insertion of the tying agent strands 4.1, 4.2 in the twine holding disk 7 for producing the second knot 3.

The twine holding disk 7 that is employed here comprises in addition a second pair 16.2 of recesses 15.1, 15.2 which are provided for producing a following knot pair 3. For this purpose, the two pairs 16.1, 16.2 of recesses 15.1, 15.2 are arranged rotated by 180° relative to each other at the twine holding disk 7.

The twine holding disk 7 comprises here two disks 7.1, 7.2 that are parallel to each other (see FIG. 3a) of the same size which are spaced apart from each other and between which a stop (not illustrated) extends concentrically about the twine holding disk axis 42. Both disks 7.1, 7.2 of the twine holding disk 7 comprise therefore both pairs 16.1, 16.2 recesses 15.1, 15.2. In addition, the recesses 15.1, 15.2 are arranged at the same rotational angle (see FIG. 3b).

The holding arrangement comprises moreover a twine clamping lever 14 (see FIG. 3a, 2f) wherein the twine clamping lever 14 interacts with the twine holding disk 7 in order to secure the tying agent strands 4.1, 4.2 in one of the recesses 15.1, 15.2. The twine clamping lever 14 comprises for this purpose at least one clamping stay 14.1 arranged between the disks 7.1, 7.2 of the twine clamping disk 7. In the present embodiment, it comprises in addition a further clamping stay 14.2 which is arranged substantially parallel to the at least one clamping stay 14.1. The second clamping stay 14.2 improves holding of the tying agent strands 4.1, 4.2 in comparison to only one clamping stay 14.1.

The at least one clamping stay 14.1 is arranged between the two disks 7.1, 7.2 of the twine clamping disk 7. It is contacting the stop of the twine holding disk 7 when no tying agent strand 4.1, 4.2 is inserted in the twine holding disk 7.

The twine clamping lever 14 is forced by the force of a spring (not illustrated) about a clamping axis 51 in a clamping direction 52 against the stop. Upon rotation of the twine holding disk 7, the tying agent strands 4.1, 4.2 inserted in the recesses 15.1, 15.2 are clamped between the twine holding disk 7 and the twine clamping lever 14. Since the twine clamping lever 14 is forced only by the force of the spring against the stop, it can yield, in particular for thicker tying agents, at least minimally opposite to the clamping direction 52. The force of the spring is however provided sufficiently great in order to ensure a safe holding of the tying agent strands 14.1, 14.2 during production of the knot 3.

Furthermore, the twine knotter 1 comprises the rotatingly driven knotter disk 8. The knotter disk 8 extends concentrically about a knotter disk axis 40 which extends in the direction of the knotter shaft 37. At the knotter disk 8, for each one of the two knots 3, respective first drive means 9.1,9.2 for driving the knotter hook 5 is arranged. For driving the knotter hook 5, the drive wheel 54 is fixedly fastened at the shaft 24 (see FIG. 3c) of the knotter hook 5. The first drive means 9.1, 9.2 are designed as tooth segments which upon rotation of the knotter disk 8 engage teeth (not identified) of the drive wheel 54 so that the drive wheel 54 is driven upon rotation of the knotter disk 8 in a rotational direction 30. In this way, the knotter hook 5 is rotated about the knotter hook axis 44 in the knotter hook rotational direction 43.

In addition, at least one second drive means 10.1 for driving the twine holding disk 7 is arranged at the knotter disk 8. The second drive means 10.1 is also embodied as a tooth segment. For driving the twine holding disk 7, a drive element 55 is fastened to the knotter frame 6 (see FIG. 4a in this context) whose teeth (not identified) upon rotation of the knotter disk 8 come into engagement with the second drive means 10.1. In this way, the drive element 55 is driven. The drive element 55 is arranged at an end of a driver shaft (not illustrated) that at its oppositely positioned end (not identified) is provided with a worm gear 56. The worm gear 56 meshes with a disk wheel 57 so that the latter, when the worm gear 56 is driven, rotates about the twine holding disk axis 42 in the twine holding disk rotational direction 41. The disk wheel 57 is also arranged at the end of a disk shaft (not illustrated) having at its oppositely positioned end (not identified) the twine holding disk 7 fixedly connected thereto. Upon driving of the disk wheel 57, the twine holding disk 7 rotates therefore together with it.

The second drive means 10.1 embodied as a tooth segment, the drive element 55, the worm gear 56 as well as the disk wheel 57 are matched to each other such that a reducing transmission ratio of 1:4 is realized. Depending on a diameter (not identified) of the knotter disk 8, a diameter (not identified) of the twine holding disk 7, and the number of teeth (not identified) at these components, a different stepdown transmission ratio can be provided however also.

The twine knotter 1 comprises moreover a stripper lever 11 for stripping the knots 3 from the knotter hook 5. The stripper lever 11 is pivotable in and opposite to a pivot direction 49 about a pivot bearing 64 through which extends a pivot axis 48.

The stripper lever 11 is approximately L-shaped. It comprises an arm 76 (see FIG. 2a) that extends away from the pivot bearing 64 toward a transverse plate 65 that extends approximately transversely thereto.

At the knotter disk 8, a stripper guide 45 is arranged at which a roller 60 (see FIG. 4a) arranged at the stripper lever 11 can run. The stripper lever 11 is pivoted, depending on the course of the stripper guide 45, about the pivot axis 48 in the pivot direction 49 and back. At the stripper lever 11, pin-shaped strippers 53 are provided which are spaced apart from each other. A distance (not identified) of the strippers 53 from each other is slightly larger than a width B (see FIG. 3d) of the knotter hook 5. The strippers 53 are provided for stripping off a knot 3 from the knotter hook 5. For this purpose, the stripper lever 11 is pivoted in the pivot direction 49. After stripping, the stripper lever 11 is pivoted back.

Moreover, the stripper lever 11 comprises a puller 13. The puller 13 extends approximately parallel to the arm 76 and is spaced therefrom. It is fastened to the transverse plate 65. With the puller 13, the ends 4.3 of the tying agent strands 4.1, 4.2 can be pulled out from the holding arrangement for finishing the second knot 3.

For cutting through the tying agent strands 4.1, 4.2, a knife blade 12 is moreover held in the twine knotter 1. The knife blade 12 is positioned such that the twine holding disk 7 upon rotation into the twine holding rotational direction 41 is guided along the knife blade 12. In this way, the tying agent strands 4.1, 4.2 inserted in the holding arrangement are cut through upon passing the knife blade 12. The knife blade 12 can be fastened for this purpose substantially stationarily in the twine knotter 1, in particular at the knotter frame. In the embodiment illustrated here, it is fastened at the twine clamping lever 14. In this embodiment, when the twine clamping lever 14 as a function of the thickness of the employed tying agent yields, it can yield slightly together therewith. Therefore, the knife blade 12 in this embodiment is not stationarily fastened in the twine knotter 1 but moves upon yielding of the twine clamping lever 14 together therewith. The phrase "substantially" accounts for this fact in the context of this invention.

In order to produce the two sequential knots 3 without generating in this context a tying agent rest for each tying agent strand 4.1, 4.2, the present invention provides that the tying agent strands 4.1, 4.2 are cut through only once between the first and the second knot 3. Moreover, the present invention provides that the twine holding disk 7 upon completion of the second knot 3 is stopped before the tying agent strands 4.1, 4.2 pass the knife blade 12. Since the twine holding disk 7 is stopped already prior to passing again the knife blade 12, the tying agent strands 4.1, 4.2 upon producing the second knot 3 are not at all cut through. In this way, when producing this knot 3, there is also no tying agent rest generated for each tying agent strand 4.1, 4.2.

Producing the two knots 3 with the twine knotter 1 will be explained in a stepwise manner in the following with the aid of FIGS. 2a-2k.

FIG. 2a shows the twine knotter 1 in the zero position. In the zero position, a knot 3 can be released from the knotter hook 5 when a pulling force 73 is acting on it which is caused in particular by the crop bale 2 and which has an extension component opposite to a second spatial direction 21 in which a shaft 24 (see FIGS. 3c-3e) of the knotter hook 5 is extending. In the zero position, neither the drive wheel 54 for driving the knotter hook 5 nor the drive element 55 for driving the twine holding disk 7 are in engagement with one of their drive means 9.1, 9.2, 10.1 on the knotter disk 8.

The knotter hook 5 and the twine holding disk 7 are therefore not driven in the zero position. In the zero position, the stripper lever 11 is located in a still slightly pivoted position about the pivot axis 48 in pivot direction 49. The upper thread 4.1 is passed through the top twine needle 47. Accordingly, a cutout (not identified), provided in the stripper lever 11 and in particular being approximately U-shaped, is arranged below the knotter hook 5.

FIG. 2b shows the twine knotter 1 in a position rotated by a rotational angle of 150°. Even in this position, neither the knotter hook 5 nor the twine holding disk 7 have rotated. The stripper lever 11 has been pivoted back opposite to the pivot direction 49. In addition, the bottom twine needle 36 has been pivoted in a feed direction 50 into the twine knotter 1. The bottom twine needle 36 is therefore in an upward stroke. It entrains the lower thread 4.2. Also, upon pivoting into the twine knotter 1, it entrains the upper thread 4.1. Upon pivoting of the bottom twine needle 36, upper thread 4.1 and lower thread 4.2 are placed into the first recess 15.1 of the two recesses 15.1, 15.2 of the first pair 16.1 of the twine holding disk 7. FIG. 2b shows the tying agent strands 4.1, 4.2 inserted in the first recess 15.1. The insertion is realized therefore by the upward stroke of the bottom needle 36.

FIG. 2c shows the twine knotter 1 in a position rotated by a rotational angle of 185°. In this position, the twine holding disk 7 has been rotated so far that the tying agent strands 4.1, 4.2 are clamped in the holding arrangement between the twine holding disk 7 and the twine clamping lever 14. The twine clamping lever 14 clamps the tying agent strands 4.1, 4.2 with the force of the spring.

In addition, in this position the drive wheel 54 is in engagement with the first one of the two first drive means 9.1, 9.2 on the knotter disk 8 so that the knotter hook 5 is driven by the knotter disk 8 and rotates about the knotter hook axis 44 in the knotter hook rotational direction 43. Visible here is the control roller 46 arranged at the backside of the knotter hook 5 and provided for driving the pivotable clamping wing 19.

Upon rotation, the tying agent strands 4.1, 4.2 are wound about the knotter hook 5. This causes a loop (not identified) to be formed about the knotter hook 5.

FIG. 2d shows the twine knotter 1 in a position rotated by a rotational angle of 205°. In this position, the knotter hook 5 has completely rotated about its knotter hook axis 44. In this context, the control roller 46 of the knotter hook 5 has been guided completely along the control guide 63 for opening and closing of the pivotable clamping wing 19. In this context, the tying agent strands 4.1, 4.2 have been inserted between the stationary clamping wings 18 and the pivotable clamping wing 19 and are positioned upstream of the projection 20 of the pivotable clamping wing 19.

The twine holding disk 7 has in addition rotated so far that the tying agent strands 4.1, 4.2 clamped in the holding arrangement are now arranged in front of a cutting edge of the knife blade 12.

Moreover, the bottom twine needle 36 has already pivoted back slightly opposite to the feed direction 50. It is therefore in a downward stroke.

FIG. 2e shows the twine knotter 1 in a position rotated by a rotational angle of 220°. In this position, the twine holding disk 7 has rotated so far that the tying agent strands 4.1, 4.2 have passed the knife blade 12 and have been cut through by it. The tying agent strands 4.1, 4.2 are therefore now divided into first tying agent strands 4.1, 4.2 at the crop bale side and second tying agent strands 4.1, 4.2 at the bottom needle side.

Upon further rotation of the twine holding disk 7, the tying agent strands 4.1, 4.2 at the bottom needle side have been inserted moreover into the second recess 15.2 of the first pair 16.1 of recesses 15.1, 15.2. When producing the second knot 3, the tying agent strands 4.1, 4.2 are therefore inserted into the twine holding disk 7 by the downward stroke of the bottom needle 36.

FIG. 2f shows an enlarged detail of FIG. 2e. Visible are the tying agent strands 4.1, 4.2 at the crop bale side wound about the knotter hook 5 immediately prior to pulling the first knot 3 from the knotter hook 5. When pulling the tying agent strands 4.1, 4.2 from the knotter hook 5, the tying agent strands 4.1, 4.2 which are inserted between the stationary clamping wings 18 and the pivotable clamping wing 19 by means of the projection 20 at the pivotable clamping wing 19 are pulled through the loop of the tying agent strands 4.1, 4.2 wound about the knotter hook 5. In this way, the first knot 3 is formed.

The tying agent strands 4.1, 4.2 are pushed or the first knot 3 is pushed by means of the stripper lever 11 from the knotter hook 5. For this purpose, the roller 60 of the stripper lever 11 is guided along the stripper guide 45. The stripper guide 45 comprises two cams (not identified) so that the stripper lever 11 upon rotation of the knotter disk 8 is pivoted twice forwardly in order to push thereby a knot 3 off the knotter hook 5, respectively. For pushing the knot 3 from the knotter hook 5, the pin-shaped strippers 53 of the stripper lever 11 that are spaced apart from each other are utilized.

So that the knot 3 can fall toward the crop bale, the gap 17 is provided in the knotter hook. The finished knot 3 falls through the gap 17 to the crop bale.

FIG. 2g shows the twine knotter 1 in a position rotated by a rotational angle of 240°. In this position, the stripper lever 11 is pivoted in pivot direction 49 and has pushed the knot 3 off the knotter hook 5. The bottom needle 36 has been pivoted back farther opposite to the feed direction 50.

FIG. 2h shows the twine knotter 1 in a position rotated by a rotational angle of 280°. In this position, the twine holding disk 7 is in an end position. It is no longer driven in the context of the actual rotation of the knotter disk 8. The tying agent strands 4.1, 4.2 clamped in the holding arrangement are arranged immediately in front of the knife blade 12.

The stripper lever 11 is pivoted back in FIG. 2h opposite to the pivot direction 48. In addition, the bottom twine needle 36 has been pivoted back at this rotational angle opposite to the feed direction 50.

The second one of the first drive means 9.2 at the knotter disk 8 has reached the drive wheel 54 of the knotter hook 5. In this way, the drive wheel 54 engages this first drive means 9.2. The twine knotter 1 is thus immediately before forming the second knot 3.

FIG. 2i shows the twine knotter 1 in a position rotated by a rotational angle of 330°. The knotter hook 5 has completed the second complete rotation about the knotter hook axis 44. Therefore, a loop about the knotter hook 5 has been formed and the tying agent strands 4.1, 4.2 have been inserted in addition below the pivotable clamping wing 19. The illustration shows therefore the second knot 3 immediately prior to being pushed off by the stripper lever 11.

FIG. 2j shows this in an enlarged detail. It can be seen that the stripper lever 11 is undergoing a pivot movement in pivot direction 49. Since the tying agent strands 4.1, 4.2 are still clamped in the holding arrangement, the puller 13 fastened at the stripper lever 11 contacts the tying agent strands 4.1, 4.2 and pulls the ends 4.3 of the tying agent strands 4.1, 4.2 during the pivot movement of the stripper lever 11 out of the holding arrangement. In addition, in analogy to the first knot 3, the second knot 3 is pushed in this context by means of the pin-shaped strippers 53 off the knotter hook 5.

Figure 2K:
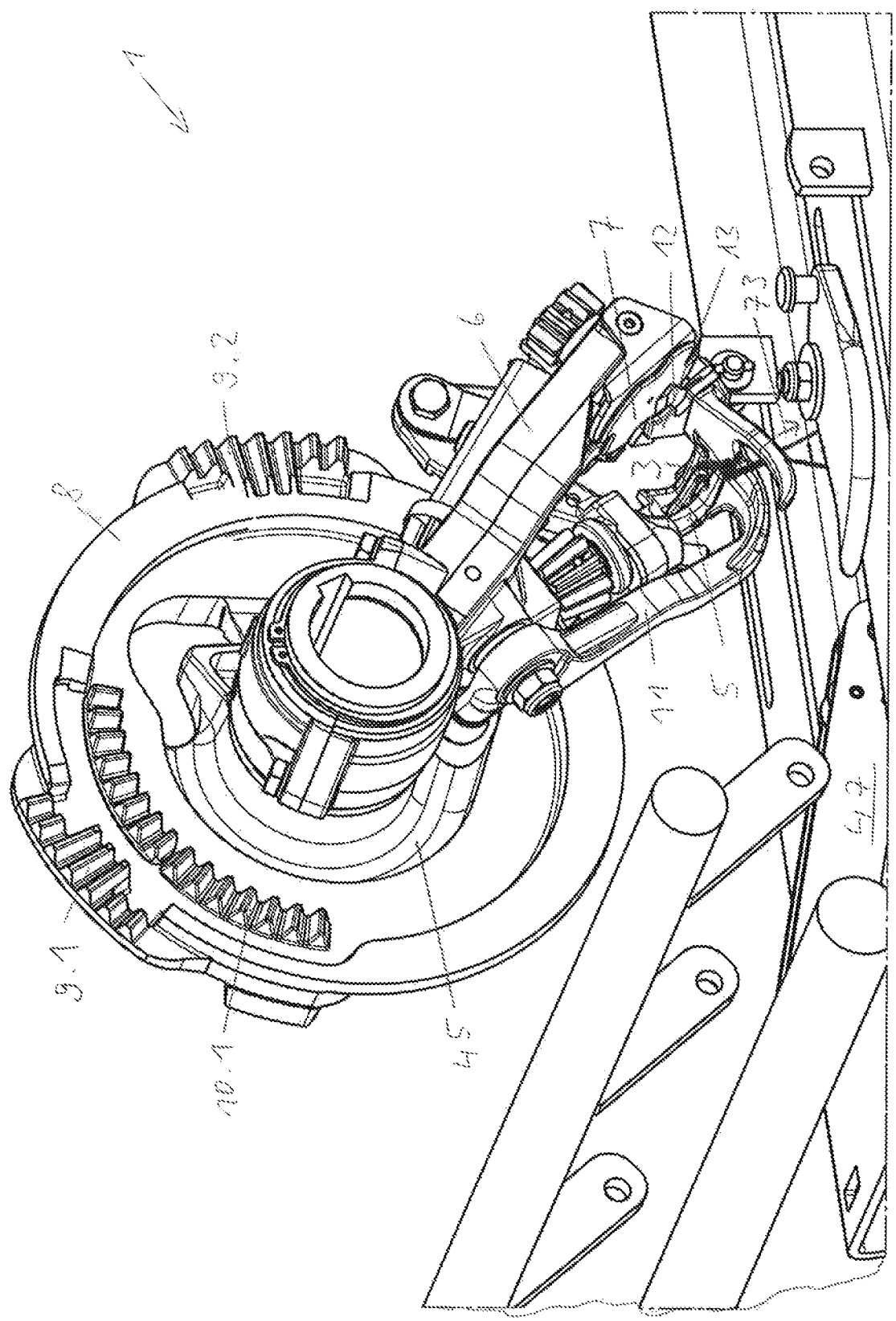

FIG. 2k shows the twine knotter 1 in a position rotated by a rotational angle of 360°. It is in the zero position (see FIG. 2a). The puller 13 has pulled the ends 4.3 of the tying agent strands 4.1, 4.2 and the strippers 53 have pushed the second knot 3 off the knotter hook 5. The second knot 3 also falls opposite to the second direction 21 through the gap 17 in the knotter hook 5 to the crop bale. The stripper lever 11 is carrying out a pivot movement opposite to the pivot direction 49.

In FIG. 2k, the pulling force 73, directed toward the crop bale and by means of which the knot 3 is pulled off the knotter hook so that it falls down from the latter, is schematically illustrated.

Figure 3E:
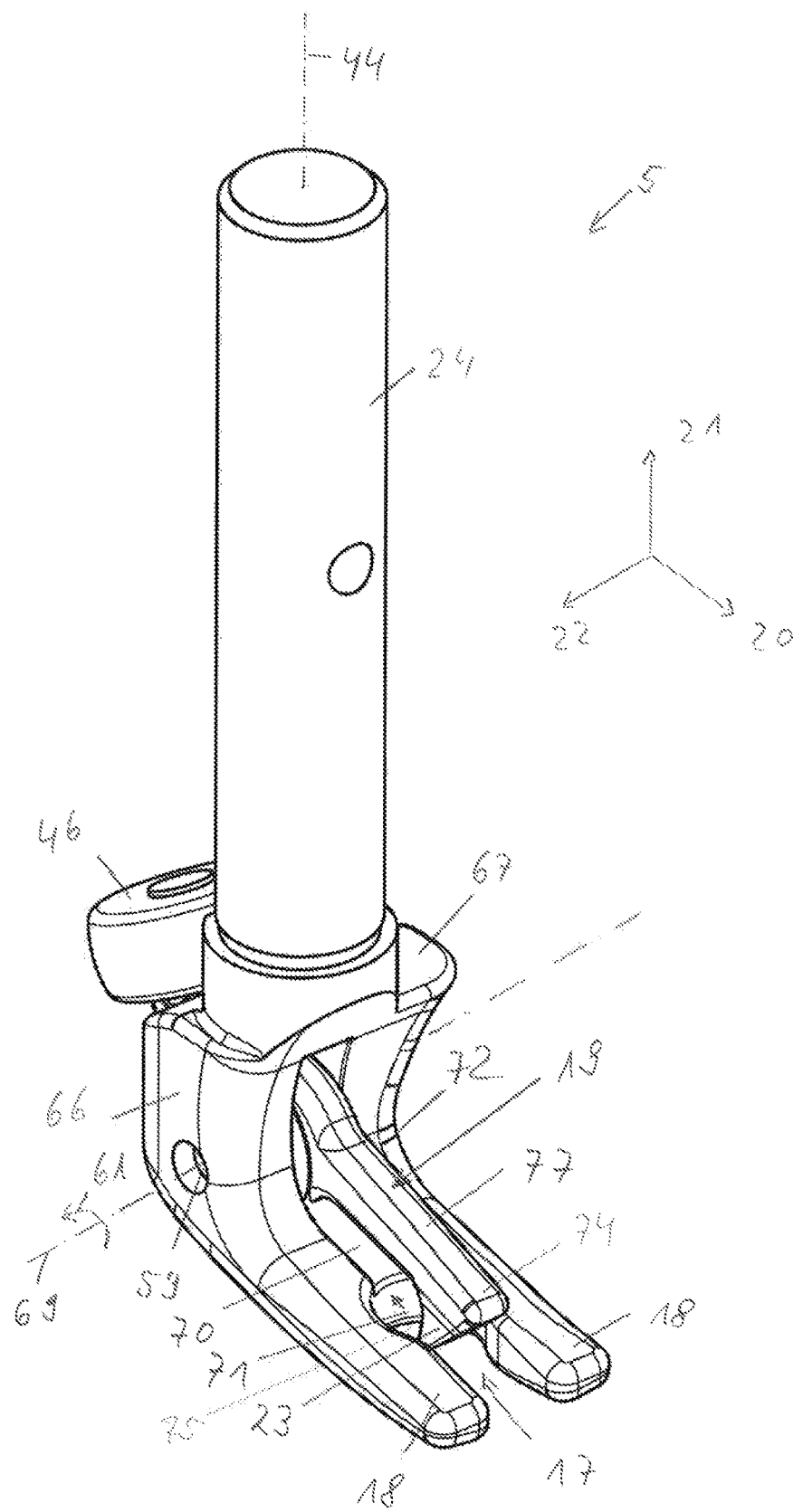
FIG. 3e shows a perspective view of the knotter hook of FIG. 3c.

FIG. 3a shows an enlarged partial view of the twine knotter 1 of FIG. 2b, in FIG. 3b a twine holding disk 7 for the twine knotter 1 of FIG. 3a, in FIG. 3c a knotter hook 5 for the twine knotter 1 of FIG. 3a in a side view, in FIG. 3d a plan view of the knotter hook 5 of FIG. 3c, and in FIG. 3e a perspective view of the knotter hook of FIG. 3c.

FIG. 3b shows one of many possible embodiments of the twine holding disk 7 in a side view. The twine holding disk 7 illustrated here is embodied for producing two knot pairs 3. Visible is one of the disks 7.1 the twine holding disk 7 with the two pairs 16.1, 16.2 of recesses 15.1, 15.2. The twine holding disk 7 can however be configured also for only one pair of knots 3 or for three or more knot pairs 3. In principle, it is however also possible to configure the twine holding disk 7 for an uneven number of knots 3 so that a recess 15.1, 15.2 of the twine holding disk 7 is used alternately for producing the first of the two knots 3 and then for producing the second of the two knots 3.

In the illustrated twine holding disk 7, between the recesses of a knot pair 3 a displacement angle α of 100° is provided. For the selected step-down transmission ratio between the knotter disk 8 and the twine holding disk 7, a displacement angle α of greater than 90° is required in order to be able to insert into the second one of the two recesses 15.2 the tying strands 4.1, 4.2. The displacement angle α can however be also significantly greater than 90°, and in particular can amount to up to approximately 150°.

Between the two pairs 16.1, 16.2 of recesses 15.1, 15.2, a complementary angle β of 80° is provided. In this way, an arrangement with rotational symmetry of the pairs 16.1, 16.2 of recesses 15.1, 15.2 is realized.

FIG. 3c shows the knotter hook 5 for the twine knotter 1 in a side view, FIG. 3d in a plan view from above, and FIG. 3e in a perspective view. The knotter hook comprises here two stationary clamping wings 18. In addition, it comprises a pivotable clamping wing 19. The clamping wings 18, 19 comprise a length extension component in the same first spatial direction 20. Also, an embodiment of a knotter hook 5 is usable that comprises only one stationary clamping wing 18 and the pivotable clamping wing 19.

The stationary clamping wing 18 extends from a base 66 of the knotter hook 5 toward a free end (not identified). The pivotable clamping wing 19, on the other hand, is supported pivotably in and opposite to the wing pivot direction 61 about a wing pivot axis 69 in a pivot wing bearing 59 that is provided in the base 66 of the knotter hook 5.

The pivotable clamping wing 19 also comprises a free end 74.

The pivotable clamping wing 19 comprises a projection 23 which is projecting in the direction toward the stationary clamping wing 18. The projection extends therefore opposite to the second spatial direction 21. It is here arranged at the free end 74 of the pivotable clamping wing 19. In principle, the pivotable clamping wing 19 can also extend past the projection 23 to its free end 74. The projection 19 extends for this purpose additionally at a substantially right angle δ to a pivot wing 77 of the pivotable wing 19 at which it is arranged. It is configured hook-shaped, here of a triangular shape.

The pivotable clamping wing 19 is arranged here laterally displaced relative to both stationary clamping wings 18 at least toward the free end of the clamping wings 18, 19, respectively, in a third spatial direction 22 that extends transversely to the first spatial direction 20 and transversely to the second spatial direction 21. In this context, the stationary clamping wings 18 are arranged mirror-symmetrical to a fictitious line (not illustrated) that is extending centrally through the pivotable clamping wing 19. The stationary clamping wings 18 comprise in this context the same length LF. In addition, the pivotable clamping wing 19 is provided shorter than the stationary clamping wings 19.

Moreover, the two stationary clamping wings 18 are spaced apart from each other here at least at the ends so that between them a gap 17 is formed. In addition, the pivotable clamping wing 19 in a plan view is arranged between the two stationary clamping wings 18 at least at the end. In this way, the projection 23 is positioned laterally relative to the two stationary clamping wings 18 between them. The gap 17 extends between the stationary clamping wings 18 and below the pivotable clamping wing 19 opposite to the first spatial direction 20 past the projection 23. In this way, not only below but also behind the projection 23 viewed opposite to the first spatial direction 21, a free space is provided through which a knot 3 that has been completed by the knotter hook 5 can fall down in this direction 21, in particular when a pulling force 73 opposite to the second spatial direction 21 is acting thereon.

The pivotable clamping wing 19 is therefore only partially height-displaced in relation to the stationary clamping wings 18 in a second spatial direction 21 which is extending transversely to the first spatial direction 20. In this way, the projection 23 engages the gap 17 between the stationary clamping wings 18 only minimally.

In principle, the gap 17 can be designed in a U-shape or V-shape. However, it has been found that an approximately key-hole shaped expansion 75 of the gap 17 is advantageous wherein in this way the gap 17 is widened at an end which is facing the pivot wing bearing 59. In this way, more space is available for the tying agent strands 4.1, 4.2 and the knot 3 can more easily and faster detach from the knotter hook 5.

The pivotable clamping wing 19 can be pivoted by pivoting in the wing pivot direction 61 from a closed state into an open state. In the open state, the free end 74 of the pivotable clamping wing 19 is spaced apart farther from the stationary clamping wings 18 than in the closed state. In the open state, the tying agent strands 4.1, 4.2 can be inserted between the stationary and the pivotable clamping wings 18, 19. The projection 23 is provided for pulling the tying agent strands 4.1, 4.2 that have been inserted between the stationary and the pivotable clamping wings 18, 19 through a tying agent loop formed of the tying agent strands 4.1, 4.2 and looped around the base 66 of the knotter hook 5. For this purpose, the pivotable clamping wing 19 is closed and the tying agent strands 4.1, 4.2 are clamped between the stationary and the pivotable clamping wings 18, 19.

In order to effect pivoting of the pivotable clamping wing 19, a control roller 46 is provided at an end oppositely positioned to the free end 74 of the pivotable clamping wing 19. The control roller 46 is arranged at a side (not identified) of the pivot wing bearing 59 that is facing away from the free end. Therefore, the pivotable clamping wing 19 is pivoted from the closed state into the open state or vice versa upon adjustment of the control roller 46.

In the twine knotter 1, the control roller 46 is guided along a control guide 63 (see FIG. 3*a*) that is arranged stationarily at the knotter frame 6. The control guide 46 enables for each one of the knots 3 a single opening from the closed state into the open state and closing from the open state into the closed state of the pivotable clamping wing 19, respectively.

The stability of the knotter hook 5 is increased in that the base 66 extends below the pivotable clamping wing 19. A length LS of the gap 17 or a length LK of the stationary clamping wing 18 relates to a length LR of the base 66 in a holding region 68 of the knotter hook 5, which is provided for clamping tying agent strands 4.1, 4.2 between the stationary clamping wings 18 and the pivotable clamping wing 19, preferably at least in a ratio of 1:1 or larger, preferably 2:1 or 3:1 or even larger. The base 66 extending below the pivotable clamping wing 19 is therefore embodied only very short in comparison to the gap 17 or to the clamping wings 18, 19. Preferably, the base 66 serves only for stabilization of the knotter hook 5. The shorter the base 66 is extending below the pivotable clamping wing 19, the larger is the gap 17 and all the more easily the knots 3, in particular when made of a relatively thick tying material, can be pulled at the end of the knotting process from the knotting hook 5.

The base 66 which is extending in the holding region 68 below the pivotable clamping wing 19 comprises in addition a recess 70 providing space for the tying agent strands 4.1, 4.2 clamped between the pivotable clamping wing 19 and the stationary clamping wings 18. In order not to chafe the tying agent strands 4.1, 4.2, the recess 70 can be rounded.

In order to facilitate pulling off the knot 3 from the knotter hook 5 even more, it is furthermore preferred that an end face 71 of the gap 17 substantially extends in the second spatial direction 21 so that a finished knot 3 cannot get caught at the end face 71 or an edge (not illustrated) of the end face 71, or get chafed.

The pivotable clamping wing 19 is embodied as a whole more narrow than the gap 17. This embodiment is advantageous when pulling the tying agent strands 4.1, 4.2 through the tying agent loop as well as when stripping off the knot 3 from the knotter hook 5.

In order to attach the knotter hook 5 rotatably in the twine knotter 1, it comprises a shaft 24 for support in the twine knotter 1. The shaft 24 is arranged in relation to the stationary clamping wings 18 at an angle γ. Since the tying agent loop for the knot 3 requires a complete rotation of the knotter hook 5 about the knotter hook axis 44, in the twine knotter 1 a free space (not identified) is required for the knotter hook 5 that corresponds to a length (not identified) of the stationary clamping wing 18. The angled arrangement of the clamping wing 18 to the shaft 24 is therefore space-saving.

The required bend 72 in the base 66 is embodied rounded so that the base 66 has no edges in the bend 72 and the tying agent strands 4.1, 4.2 cannot become chafed at the bend 72.

Formation of the tying agent loop about the base 66 of the knotter hook 5 is facilitated by a ramp-shaped expansion 67 of the base 66 below the shaft 24 by means of which the tying agent loop, upon rotation of the knotter hook 5, winds about the base 66 below the control roller 46.

Figure 4A:
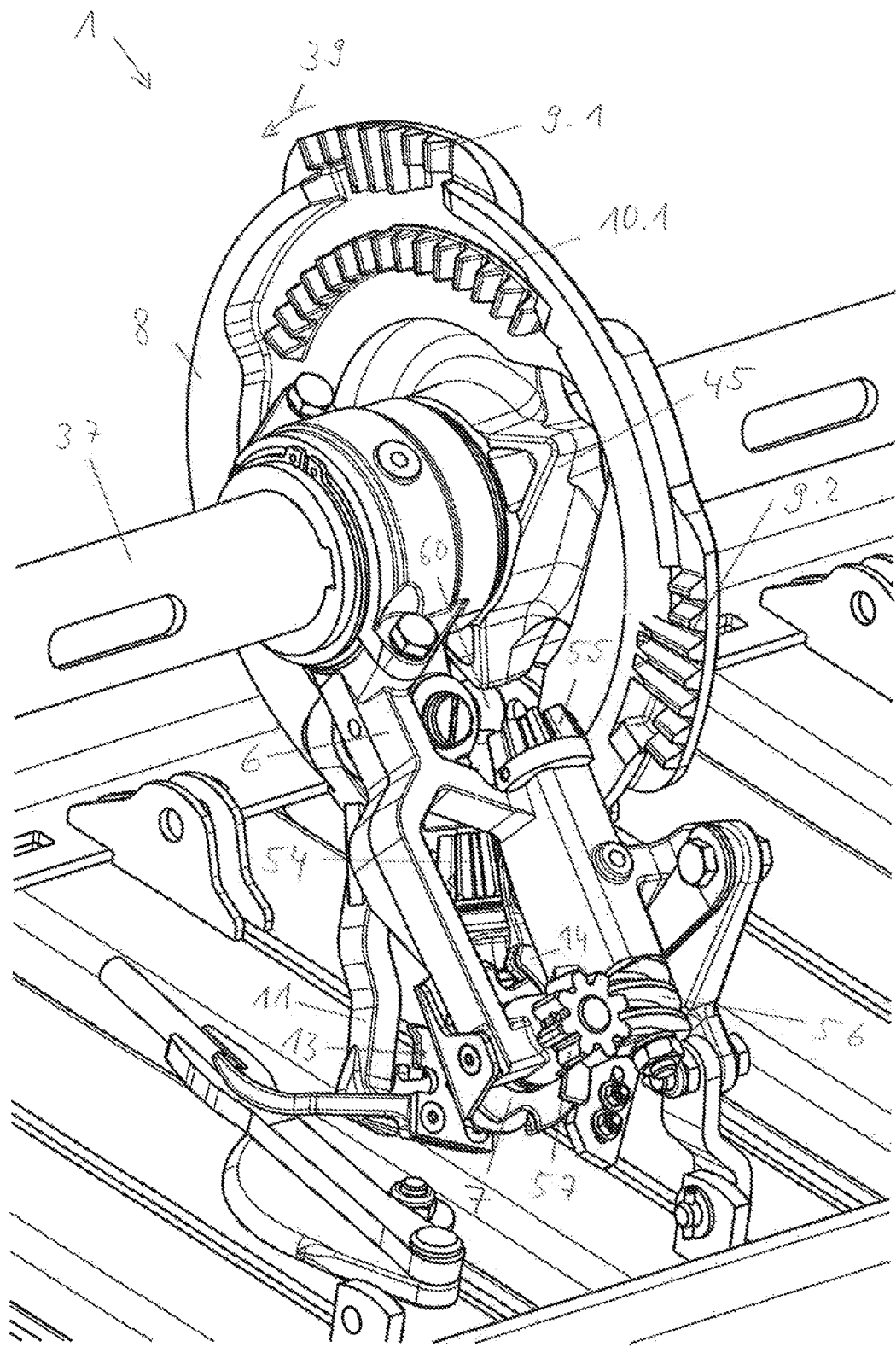
FIG. 4a shows a further perspective view of the twine knotter of FIGS. 2a to 2k.

FIG. 4*a* shows a further perspective view of the twine knotter 1 of FIGS. 2*a*-2*k*, and FIG. 4*b* shows a perspective view of a further embodiment of a twine knotter 1' for the knotter arrangement 34 of FIG. 1*b*.

The tying process of the twine knotter 1 of FIG. 4*a* for producing the two knots 3 comprises the following steps:
 a. Inserting the tying agent strands 4.1, 4.2 into the first recess 15.1 of the first pair 16.1 of recesses 15.1, 15.2 at the twine holding disk 7 in the upward stroke of the bottom needle 36;
 b. Rotating the twine holding disk 7 and thereby clamping the tying agent strands 4.1, 4.2;
 c. During rotation of the twine holding disk 7, rotating the knotter hook 5, wherein the pivotable clamping wing 19 is pivoted once from the closed state into the open state and back in order to place the tying agent strands 4.1, 4.2 between the stationary and the pivotable clamping wings 18, 19;
 d. During rotation of the twine holding disk 7, inserting the tying agent strands 4.1, 4.2 into the second recess 15.2 of the two recesses 15.1, 15.2 of the pair 16.1 during the downward stroke of the bottom needle 36;
 e. Upon further rotation of the twine holding disk 7, passing the knife blade 12 whereby the tying agent strands 4.1, 4.2 are cut through by the knife blade 12;
 f. Pivoting the stripper lever 11 for stripping off the first knot 3 from the knotter hook 5;
 g. Stopping the twine holding disk 7 when the tying agent strands 4.1, 4.2 have arrived in front of the cutting edge of the knife blade 12;
 h. Rotating the knotter hook 5 in analogy to (c);
 i. Pivoting the stripper lever 11 for pulling out the ends 4.3 of the tying agent strands 4.1, 4.2 with the puller 13 of the stripper lever 11 from the holding arrangement and for stripping off the second knot 3 from the knotter hook 5;
 j. Pulling out the knot 3 from the twine knotter 1 by a pulling force on the knot 3 opposite to the second direction 21, in particular caused by advancing the crop bale 2.

The method for forming the two sequential knots 3 comprises therefore the essential features that between the first and the second knot 3 the tying agent strands 4.1, 4.2 are cut through and that the twine holding disk 7 is stopped before the tying agent strands 4.1, 4.2 have passed the knife blade 12 in the production of the second knot 3.

Figure 4B:
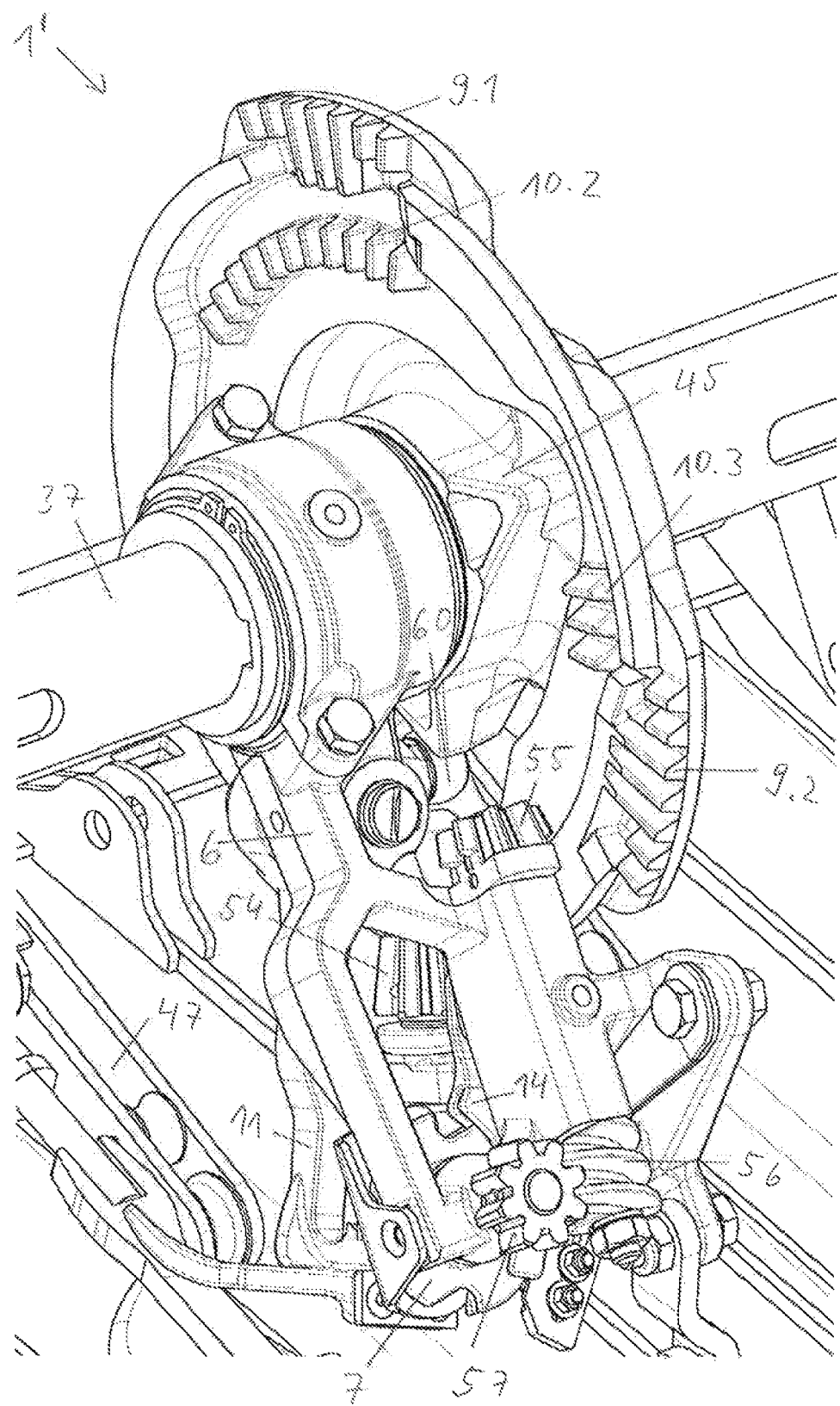
FIG. 4b shows a perspective view of a further embodiment of a twine knotter for the knotter arrangement of FIG. 1b.

The embodiment of the twine knotter 1' of FIG. 4*b* not only comprises a single second drive means 10.1 for driving the twine holding disk 7 but two second drive means 10.1, 10.2. The second one of the two second drive means 10.1, 10.2 is embodied also as a tooth segment.

In the here provided twine holding disk 7, the twine knotter 1' in analogy to the embodiment of FIG. 4*a* rotates by 180° per knot pair 3. In this embodiment of the twine knotter 1', a rotational angle of the twine holding disk 7 of 135° is however carried out during the formation of the first knot 3 due to the first one of the two second drive means 10.1. In this context, the twine holding disk 7 guides the tying agent strands 4.1, 4.2 along the knife blade 12 so that they are cut through. During the production of the second knot 3, the twine holding disk 7 rotates about the still missing rotational angle of 45°. For this purpose, the second one of the two second drive means 10.1 is provided. The tying agent strands 4.1, 4.2 are subsequently held in the holding arrangement above a cutting edge of the knife blade 12 and are not cut through.

Therefore, the method for forming the two sequentially produced knots 3 in this embodiment of the twine knotter 1' also comprises the important features that between the first and the second knots 3 the tying agent strands 4.1, 4.2 are cut through and that the twine holding disk 7 is stopped before the tying agent strands 4.1, 4.2 in the production of the second knot 3 pass the knife blade 12.

In the embodiment of FIG. 4b, the length of the tying agent strands 4.1, 4.2, held by the holding arrangement at the backside of the twine holding disk 7 between the production of the first knot 3 and the production of the second knot 3, corresponds to the rotational angle that the twine holding disk 7 upon being driven by the first one of the two second drive means 10.1 covers before the tying agent strands 4.1, 4.2 are cut. This rotational angle amounts here to 135°. In contrast to this, the twine holding disk 7 in the embodiment of the twine knotter 1 of FIG. 4a only covers a rotational angle of 100° before the tying agent strands 4.1, 4.2 are cut. The ends 4.3 of the tying agent strands 4.1, 4.2 that are held in the holding arrangement for forming the second knot 3 are therefore longer in the embodiment of the twine knotter 1' of FIG. 4b than in the embodiment of the twine knotter 1 of FIG. 4a. In order to save tying material, the embodiment of FIG. 4a has therefore proven to be advantageous in comparison to that of FIG. 4b.

In comparison to the afore described tying process of the twine knotter 1 of FIG. 4a, producing the two knots 3 in the twine knotter 1' of FIG. 4b therefore comprises the steps:

a. Inserting the tying agent strands 4.1, 4.2 into the first recess 15.1 of the first pair 16.1 of recesses 15.1, 15.2 at the twine holding disk 7 in the upward stroke of the bottom needle 36;

b. Rotating the twine holding disk 7 and clamping the tying agent strands 4.1, 4.2;

c. During the rotation of the twine holding disk 7, rotating the knotter hook 5, wherein the pivotable clamping wing 19 is pivoted once from the closed into the open state and back in order to place the tying agent strands 4.1, 4.2 between the stationary and the pivotable clamping wings 18, 19;

d. Rotating the twine holding disk 7 farther, wherein the tying agent strands 4.1, 4.2 pass the knife blade 12 and thereby are cut through;

e. Pivoting the stripper lever 11 for stripping off the first knot 3 from the knotter hook 5;

f. Stopping the twine holding disk 7;

g. Inserting the tying agent strands 4.1, 4.2 into the second recess 15.2 of the two recesses 15.1, 15.2 of the pair 16.1 upon downward stroke of the bottom needle 36;

h. Rotating the twine holding disk 7 farther;

i. Rotating the knotter hook 5 in analogy to (c);

j. Pulling out the ends of the tying agent strand 4.3 with the puller 13 of the stripper lever 11 from the holding arrangement and stripping off the second knot 3 from the knotter hook 5;

k. Pulling out the knot 3 from the twine knotter 1 by a pulling force on the knot 3 opposite to the second direction 21, in particular caused by advancing the crop bale 2.

What is claimed is:

1. A knotter hook for a twine knotter for producing a loop knot, the knotter hook comprising:
   a single stationary clamping wing;
   a pivotable clamping wing, wherein the single stationary clamping wing and the pivotable clamping wing comprise an extension component in a same first spatial direction;
   wherein the pivotable clamping wing comprises a projection projecting in a direction toward the single stationary clamping wing;
   wherein the pivotable clamping wing is configured to pivot reversibly from a closed state into an open state so that a free end of the pivotable clamping wing in the open state is spaced apart farther from the single stationary clamping wing than in the closed state;
   wherein the pivotable clamping wing is laterally displaced relative to the single stationary clamping wing at least in sections thereof so that the pivotable clamping wing is arranged adjacent to the single stationary clamping wing and so that below the pivotable clamping wing a free space is formed, wherein the free space is arranged below the projection and extends in the closed state opposite to the first spatial direction beyond the projection;
   wherein the projection projects into the free space in the closed state; and
   wherein the knotter hook is configured to release a knot formed at the knotter hook from the projection in a downward direction while the pivotable clamping wing is in the closed state.

2. The knotter hook according to claim 1, wherein the pivotable clamping wing is shorter than the single stationary clamping wing.

3. The knotter hook according to claim 1, further comprising a shaft configured to support the knotter hook at the twine knotter, wherein the shaft is arranged at an angle in relation to the single stationary clamping wing.

4. The knotter hook according to claim 1, further comprising a holding region configured to clamp tying agent strands between the pivotable clamping wing and the single stationary clamping wing, wherein a ratio of a length of the single stationary clamping wing to a length of a base of the knotter hook in the holding region amounts to at least 1:1.

5. The knotter hook according to claim 1, wherein the projection is arranged at the free end of the pivotable clamping wing.

6. The knotter hook according to claim 1, wherein the projection extends at a substantially right angle relative to a pivotable wing of the pivotable clamping wing.

7. A knotter hook for a twine knotter for producing a loop knot, the knotter hook comprising:
   a first stationary clamping wing and a second stationary clamping wing, wherein the first stationary clamping wing and the second stationary clamping wing are connected to a base and extend away from the base and each comprise a free end remote from the base, wherein the first stationary clamping wing and the second stationary clamping wing are spaced apart from each other at least at the free ends remote from the base so that a gap is formed between the first stationary clamping wing and the second stationary clamping wing at least at the free ends remote from the base;
   a pivotable clamping wing, wherein the first stationary clamping wing and the pivotably supported clamping wing comprise an extension component in a same first spatial direction;
   wherein the pivotable clamping wing comprises a projection projecting in a direction toward the first stationary clamping wing;
   wherein the pivotable clamping wing is configured to pivot reversibly from a closed state into an open state so that a free end of the pivotable clamping wing in the open state is spaced apart farther from the first stationary clamping wing than in the closed state;
   wherein the pivotable clamping wing extends in and/or above the gap between the first stationary clamping wing and the second stationary clamping wing and wherein the projection projects into the gap in the closed state;

wherein the gap in the closed state extends opposite to the first spatial direction beyond the projection;

wherein the knotter hook is configured to release a knot formed at the knotter hook from the projection in a downward direction while the pivotable clamping wing is in the closed state.

8. The knotter hook according to claim 7, wherein the gap extends at least along approximately a fourth of a length of the first stationary clamping wing opposite to the first spatial direction behind the projection.

9. The knotter hook according to claim 7, wherein the pivotable clamping wing in a plan view is arranged at least with the free end between the first stationary clamping wing and the second stationary clamping wing.

10. The knotter hook according to claim 7, wherein the first stationary clamping wing and the second stationary clamping wing are mirror-symmetrically arranged in relation to a fictitious line extending centrally through the pivotable clamping wing.

11. The knotter hook according to claim 7, wherein a length of the first stationary clamping wing is identical to a length of the second stationary clamping wing.

12. The knotter hook according to claim 7, wherein the pivotable clamping wing is shorter than the first stationary clamping wing and/or the second stationary clamping wing.

13. The knotter hook according to claim 7, wherein the pivotable clamping wing at least in sections thereof is narrower than the gap.

14. The knotter hook according to claim 7, further comprising a shaft configured to support the knotter hook at the twine knotter, wherein the shaft is arranged at an angle in relation to the first stationary clamping wing and to the second stationary clamping wing.

15. The knotter hook according to claim 7, wherein the gap is substantially U-shaped or V-shaped.

16. The knotter hook according to claim 7, wherein the gap comprises an expansion and is approximately keyhole-shaped, wherein the projection in the closed state dips into the expansion.

17. The knotter hook according to claim 7, further comprising a holding region configured to clamp tying agent strands between the first stationary clamping wing and the second stationary clamping wing and the pivotable clamping wing, wherein a ratio of a length of the gap or a length of the first stationary clamping wing or of the second stationary clamping wing to a length of a base of the knotter hook in the holding region amounts to at least 1:1.

18. The knotter hook according to claim 7, wherein the projection is arranged at the free end of the pivotable clamping wing.

19. The knotter hook according to claim 7, wherein the projection extends at a substantially right angle relative to a pivotable wing of the pivotable clamping wing.

20. A twine knotter comprising a knotter hook according to claim 1.

21. A twine knotter comprising a knotter hook according to claim 7.

22. A bale press comprising a twine knotter, the twine knotter comprising a knotter hook according to claim 1.

23. A bale press comprising a twine knotter, the twine knotter comprising a knotter hook according to claim 7.

* * * * *